United States Patent
Ajami et al.

(10) Patent No.: US 12,543,117 B2
(45) Date of Patent: Feb. 3, 2026

(54) TARGET WAKE TIME (TWT) COORDINATION TECHNIQUES

(71) Applicant: QUALCOMM Incorporated, San Diego, CA (US)

(72) Inventors: Abdel Karim Ajami, San Diego, CA (US); Abhishek Pramod Patil, San Diego, CA (US); George Cherian, San Diego, CA (US); Alfred Asterjadhi, San Diego, CA (US); Yanjun Sun, San Diego, CA (US); Sai Yiu Duncan Ho, San Diego, CA (US); Gaurang Naik, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 323 days.

(21) Appl. No.: 18/346,708

(22) Filed: Jul. 3, 2023

(65) Prior Publication Data
US 2025/0016683 A1    Jan. 9, 2025

(51) Int. Cl.
*H04W 52/02* (2009.01)
(52) U.S. Cl.
CPC .............................. *H04W 52/0248* (2013.01)
(58) Field of Classification Search
None
See application file for complete search history.

(56) References Cited

U.S. PATENT DOCUMENTS

| | | | |
|---|---|---|---|
| 9,717,085 B2* | 7/2017 | Sorrentino | H04L 27/2655 |
| 2018/0110046 A1* | 4/2018 | Patil | H04W 72/0446 |
| 2018/0288792 A1* | 10/2018 | Blasco Serrano | H04W 72/20 |
| 2021/0099953 A1* | 4/2021 | Wentink | H04W 52/0206 |
| 2021/0297949 A1 | 9/2021 | Liu et al. | |
| 2022/0116870 A1* | 4/2022 | Cariou | H04W 76/15 |
| 2022/0210819 A1* | 6/2022 | Sevindik | H04W 72/1263 |
| 2023/0020265 A1 | 1/2023 | Min et al. | |
| 2023/0199641 A1 | 6/2023 | Naik et al. | |
| 2024/0098655 A1* | 3/2024 | Shanbhag Kota | H04W 52/0245 |

OTHER PUBLICATIONS

International Search Report and Written Opinion—PCT/US2024/029074—ISA/EPO—Oct. 8, 2024.

* cited by examiner

*Primary Examiner* — Xavier S Wong
(74) *Attorney, Agent, or Firm* — Holland & Hart LLP/Qualcomm

(57) ABSTRACT

This disclosure provides methods, components, devices and systems for target wake time (TWT) coordination. Some aspects relate to resolving an overlap between a first time period associated with a first TWT agreement and a second time period associated with a second TWT agreement. A first wireless device may receive first scheduling information associated with a first set of one or more time periods during which the first wireless device is capable of communicating with a second wireless device in accordance with the first TWT agreement. The first wireless device may receive second scheduling information associated with a second set of one or more time periods during which the first wireless device is capable of communicating with a third wireless device in accordance with the second TWT agreement. The first wireless device may transmit availability information to resolve the overlap between the first time period and the second time period.

20 Claims, 9 Drawing Sheets

TARGET WAKE TIME (TWT) COORDINATION TECHNIQUES

TECHNICAL FIELD

This disclosure relates to wireless communication and, more specifically, to target wake time (TWT) coordination techniques.

DESCRIPTION OF THE RELATED TECHNOLOGY

A wireless local area network (WLAN) may be formed by one or more wireless access points (APs) that provide a shared wireless communication medium for use by multiple client devices also referred to as wireless stations (STAs). The basic building block of a WLAN conforming to the Institute of Electrical and Electronics Engineers (IEEE) 802.11 family of standards is a Basic Service Set (BSS), which is managed by an AP. Each BSS is identified by a Basic Service Set Identifier (BSSID) that is advertised by the AP. An AP periodically broadcasts beacon frames to enable any STAs within wireless range of the AP to establish or maintain a communication link with the WLAN.

In some WLANs, a STA may be configured with a target wake time (TWT) schedule that defines when the STA transitions from a power saving (PS) mode to an active mode. Different TWT schedules can be defined for different communication modes.

SUMMARY

The systems, methods, and devices of this disclosure each have several innovative aspects, no single one of which is solely responsible for the desirable attributes disclosed herein.

One innovative aspect of the subject matter described in this disclosure can be implemented in a first wireless device. The first wireless device may include a processing system that includes processor circuitry and memory circuitry that stores code. The processing system may be configured to cause the first wireless device to receive first scheduling information associated with a first set of multiple recurring time periods during which the first wireless device is capable of communicating with a second wireless device in accordance with a first communication mode, receive second scheduling information associated with a second set of multiple recurring time periods during which the first wireless device is capable of communicating with a third wireless device in accordance with a second communication mode, and transmit an indication of an availability schedule associated with the first wireless device in accordance with resolving an overlap between at least a first time period of the first set of multiple recurring time periods and a second time period of the second set of multiple recurring time periods.

Another innovative aspect of the subject matter described in this disclosure can be implemented in a method for wireless communication by a first wireless device. The method may include receiving first scheduling information associated with a first set of multiple recurring time periods during which the first wireless device is capable of communicating with a second wireless device in accordance with a first communication mode, receiving second scheduling information associated with a second set of multiple recurring time periods during which the first wireless device is capable of communicating with a third wireless device in accordance with a second communication mode, and transmitting an indication of an availability schedule associated with the first wireless device in accordance with resolving an overlap between at least a first time period of the first set of multiple recurring time periods and a second time period of the second set of multiple recurring time periods.

One innovative aspect of the subject matter described in this disclosure can be implemented in a third wireless device. The third wireless device may include a processing system that includes processor circuitry and memory circuitry that stores code. The processing system may be configured to cause the third wireless device to receive first scheduling information associated with a first set of multiple of recurring time periods during which a first wireless device is capable of communicating with a second wireless device in accordance with a first communication mode, transmit second scheduling information associated with a second set of multiple recurring time periods during which the first wireless device is capable of communicating with the third wireless device in accordance with a second communication mode, and receive an indication of an availability schedule associated with the first wireless device in accordance with resolving an overlap between at least a first time period of the first set of multiple recurring time periods and a second time period of the second set of multiple recurring time periods.

Another innovative aspect of the subject matter described in this disclosure can be implemented in a method for wireless communication by a third wireless device. The method may include receiving first scheduling information associated with a first set of multiple of recurring time periods during which a first wireless device is capable of communicating with a second wireless device in accordance with a first communication mode, transmitting second scheduling information associated with a second set of multiple recurring time periods during which the first wireless device is capable of communicating with the third wireless device in accordance with a second communication mode, and receiving an indication of an availability schedule associated with the first wireless device in accordance with resolving an overlap between at least a first time period of the first set of multiple recurring time periods and a second time period of the second set of multiple recurring time periods.

In some implementations of the subject matter described in this disclosure, the first wireless device may update or terminate a target wake time (TWT) agreement associated with the first set of multiple recurring time periods or the second set of multiple recurring time periods to resolve the overlap between the first time period and the second time period.

In some implementations of the subject matter described in this disclosure, the TWT agreement includes one or more of a peer to peer (P2P) TWT agreement, an individual TWT agreement, a broadcast TWT agreement, or a restricted TWT agreement associated with the first set of multiple recurring time periods or the second set of multiple recurring time periods.

Details of one or more implementations of the subject matter described in this disclosure are set forth in the accompanying drawings and the description below. Other features, aspects, and advantages will become apparent from the description, the drawings, and the claims. Note that the relative dimensions of the following figures may not be drawn to scale.

BRIEF DESCRIPTION OF THE DRAWINGS

Like reference numbers and designations in the various drawings indicate like elements.

DETAILED DESCRIPTION

Figure 1:
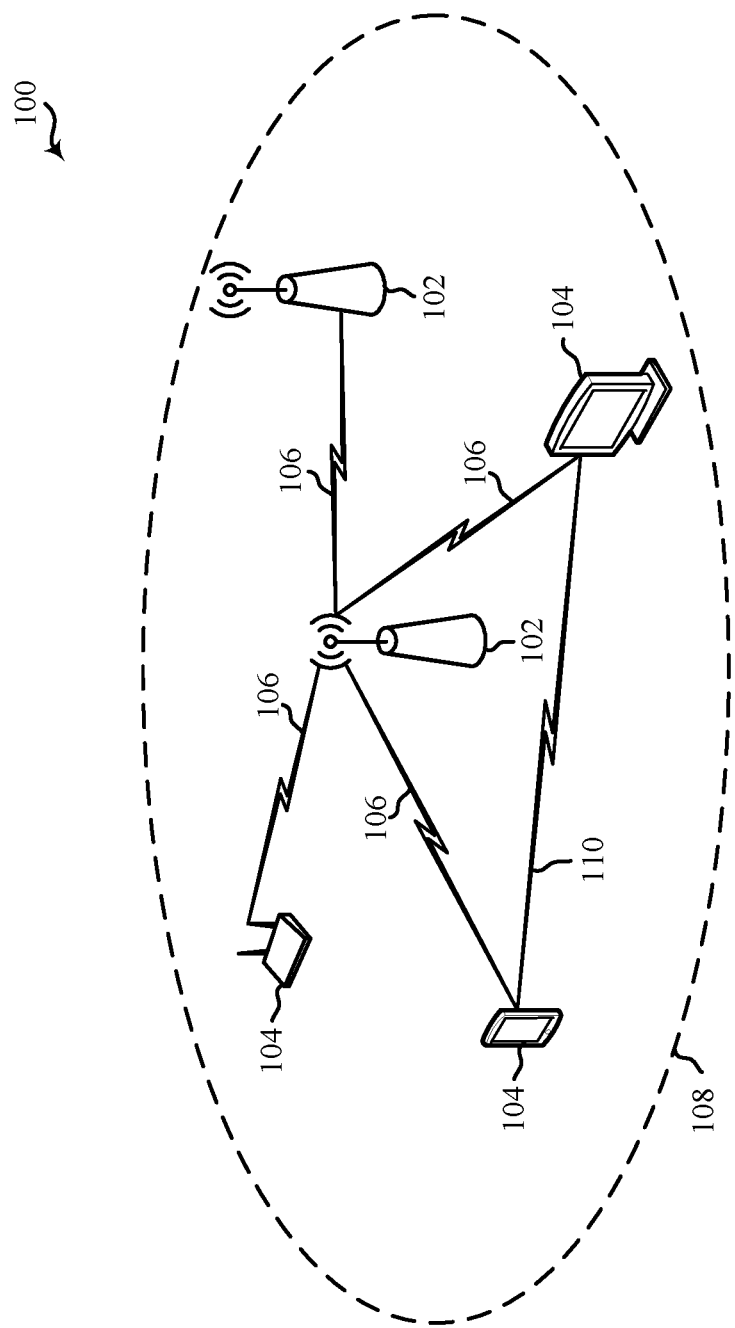
FIG. 1 shows a pictorial diagram of an example wireless local area network (WLAN).

The following description is directed to some particular examples for the purposes of describing innovative aspects of this disclosure. However, a person having ordinary skill in the art will readily recognize that the teachings herein can be applied in a multitude of different ways. Some or all of the described examples may be implemented in any device, system or network that is capable of transmitting and receiving radio frequency (RF) signals according to one or more of the Institute of Electrical and Electronics Engineers (IEEE) 802.11 standards, the IEEE 802.15 standards, the Bluetooth® standards as defined by the Bluetooth Special Interest Group (SIG), or the Long Term Evolution (LTE), 3G, 4G or 5G (New Radio (NR)) standards promulgated by the 3rd Generation Partnership Project (3GPP), among others.

The described examples can be implemented in any device, system or network that is capable of transmitting and receiving RF signals according to one or more of the following technologies or techniques: code division multiple access (CDMA), time division multiple access (TDMA), frequency division multiple access (FDMA), orthogonal FDMA (OFDMA), single-carrier FDMA (SC-FDMA), spatial division multiple access (SDMA), rate-splitting multiple access (RSMA), multi-user shared access (MUSA), single-user (SU) multiple-input multiple-output (MIMO) and multi-user (MU)-MIMO. The described examples also can be implemented using other wireless communication protocols or RF signals suitable for use in one or more of a wireless personal area network (WPAN), a wireless local area network (WLAN), a wireless wide area network (WWAN), a wireless metropolitan area network (WMAN), or an internet of things (IoT) network.

In a wireless local area network (WLAN), a wireless station (STA) may communicate with a wireless access point (AP) via a first communication link, such as a link associated with an AP operating channel. The STA also may communicate with at least one client device (such as an extended reality (XR) device, a wearable device, a smartphone device, or peripheral device) via a second communication link, (such as a peer-to-peer (P2P) channel). In some implementations, to conserve power, the STA may periodically transition from an active mode to a power saving (PS) mode in accordance with a first target wake time (TWT) agreement (also referred to as a TWT schedule or session) between the AP and the STA. The first TWT agreement between the AP and the STA may include an individual TWT agreement (supporting communications between the AP and the STA on an individual basis), a broadcast TWT agreement (supporting broadcast communications from the AP to a group of STAs), or a restricted TWT agreement (supporting exclusive access to a wireless channel for a set of one or more STAs) between the AP and the STA.

For example, the STA may enter a PS mode until the start of a TWT service period (SP), or recurring time period, at which point the STA may switch to an active mode and exchange one or more frames with the AP via the first communication link. A STA that operates according to a TWT agreement may result in greater power savings (at either or both of the AP and the STA) and improved spectral efficiency. In some implementations, however, the STA also may be configured with a second TWT agreement (such as a P2P TWT agreement between the STA and the at least one client device). If, for example, an SP associated with the first TWT agreement overlaps with an SP associated with the second TWT agreement, it may be unclear whether the STA is to comply with the first TWT agreement or the second TWT agreement. This lack of clarity may cause the AP to assume that the STA is in the active mode when the STA is actually in the PS mode, or that the STA is in the PS mode when the STA is actually in the active mode. Either of these incorrect assumptions may result in an inefficient use of power and spectral resources by the AP and STA.

Various aspects relate generally to TWT coordination and coexistence schemes. Some aspects more specifically relate to communication between the STA and the AP to resolve scheduling conflicts that result from overlapping TWT SPs. For example, when a first wireless device (such as a STA) determines that a first SP associated with a first TWT agreement (such as a P2P TWT agreement) between the first wireless device and a second wireless device (such as a client device or another STA) overlaps with a second SP associated with a second TWT agreement (such as an individual, broadcast, or restricted TWT agreement) between the first wireless device and a third wireless device (such as an AP), the first wireless device may resolve the overlap according to a prioritization scheme. The UE may resolve the overlap by updating one or both of the first TWT agreement or the second TWT agreement. In some implementations, the first wireless device may prioritize the second TWT agreement and update or tear down (such as terminate) the first TWT agreement. In some other implementations, the first wireless device may prioritize the first TWT agreement and update or tear down the second TWT agreement. According to the prioritization of the first TWT agreement or the second TWT agreement, the first wireless device may transmit one or more frames to notify the second wireless device or the third wireless device that the first wireless device intends to be available during the first SP, the second SP, or both. In some implementations, the first wireless device may use both overlapping SPs to communicate with the second wireless device and the third wireless device.

Particular aspects of the subject matter described in this disclosure can be implemented to realize one or more of the following potential advantages. In some implementations, by configuring the first wireless device to provide SP availability information (also referred to as an availability schedule) to the second wireless device and the third wireless device, the described techniques may promote more efficient utilization of communication resources, lower resource overhead, and greater power savings. For example, if the third wireless device receives an indication that the first wireless device will be available during an upcoming individual, broadcast, or restricted TWT SP that overlaps with a P2P TWT SP, the third wireless device can transmit downlink (DL) buffered units (BUs), allocate uplink resources (for example, by sending one or more Trigger frames) or allocate P2P resources (for example, by sending one or more Triggered Transmit Opportunity (TXOP) Sharing frames) to the first wireless device during the upcoming TWT SP, thereby promoting higher throughput, reduced latency, and improved device coordination. Similarly, if the second wireless device receives an indication that the first wireless device will be unavailable during an upcoming P2P TWT SP, the second wireless device can skip the P2P TWT SP and transition to (or remain in) a PS mode, thereby resulting in greater power savings at the second wireless device. The coordination schemes described herein may also promote in-device coexistence, as some communication modules can be used by another radio access technology (RAT) if a number of spatial streams or bandwidth differs between a P2P link and an infra-AP link.

FIG. 1 shows a pictorial diagram of an example WLAN 100. According to some aspects, the wireless communication network 100 can be an example of a Wi-Fi network. For example, the WLAN 100 can be a network implementing at least one of the IEEE 802.11 family of wireless communication protocol standards (such as that defined by the IEEE 802.11-2020 specification or amendments thereof including, but not limited to, 802.11ay, 802.11ax, 802.11az, 802.11ba, 802.11bd, 802.11be, 802.11bf, and 802.11bn). The WLAN 100 may include numerous wireless communication devices such as a wireless AP 102 and multiple wireless STAs1. While only one AP 102 is shown in FIG. 1, the WLAN network 100 also can include multiple APs 102. AP 102 shown in FIG. 1 can represent various different types of APs including but not limited to enterprise-level APs, single-frequency APs, dual-band APs, standalone APs, software-enabled APs (soft APs), and multi-link APs. The coverage area and capacity of a cellular network (such as LTE, 5G NR, etc.) can be further improved by a small cell which is supported by an AP 102 serving as a miniature base station. Furthermore, private cellular networks also can be set up through a wireless area network using small cells.

Each of the STAs 104 also may be referred to as a mobile station (MS), a mobile device, a mobile handset, a wireless handset, an access terminal (AT), a user equipment (UE), a subscriber station (SS), or a subscriber unit, among other examples. The STAs 104 may represent various devices such as mobile phones, personal digital assistant (PDAs), other handheld devices, netbooks, notebook computers, tablet computers, laptops, chromebooks, XR headsets, wearable devices, display devices (for example, TVs (including smart TVs), computer monitors, navigation systems, among others), music or other audio or stereo devices, remote control devices ("remotes"), printers, kitchen appliances (including smart refrigerators) or other household appliances, key fobs (for example, for passive keyless entry and start (PKES) systems), Internet of Things (IoT) devices, and vehicles, among other examples. The various STAs 104 in the network are able to communicate with one another via the AP 102.

A single AP 102 and an associated set of one or more STAs 104 may be referred to as a basic service set (BSS), which is managed by the respective AP 102. FIG. 1 additionally shows an example coverage area 108 of the AP 102, which may represent a basic service area (BSA) of the WLAN 100. The BSS may be identified or indicated to users by a service set identifier (SSID), as well as to other devices by a basic service set identifier (BSSID), which may be a medium access control (MAC) address of the AP 102. The AP 102 may periodically broadcast beacon frames ("beacons") including the BSSID to enable any STAs 104 within wireless range of the AP 102 to "associate" or re-associate with the AP 102 to establish a respective communication link 106 (hereinafter also referred to as a "Wi-Fi link"), or to maintain a communication link 106, with the AP 102. For example, the beacons can include an identification or indication of a primary channel used by the respective AP 102 as well as a timing synchronization function for establishing or maintaining timing synchronization with the AP 102. The AP 102 may provide access to external networks to various STAs 104 in the WLAN via respective communication links 106.

To establish a communication link 106 with an AP 102, each of the STAs 104 is configured to perform passive or active scanning operations ("scans") on frequency channels in one or more frequency bands (for example, the 2.4 GHz, 5 GHz, 6 GHz or 60 GHz bands). To perform passive scanning, a STA 104 listens for beacons, which are transmitted by respective APs 102 at a periodic time interval referred to as the target beacon transmission time (TBTT) (measured in time units (TUs) where one TU may be equal to 1024 microseconds (μs)). To perform active scanning, a STA 104 generates and sequentially transmits probe requests on each channel to be scanned and listens for probe responses from APs 102. Each STA 104 may identify, determine, ascertain, or select an AP 102 with which to associate in accordance with the scanning information obtained through the passive or active scans, and to perform authentication and association operations to establish a communication link 106 with the selected AP 102. The AP 102 assigns an association identifier (AID) to the STA 104 at the culmination of the association operations, which the AP 102 uses to track the STA 104.

As a result of the increasing ubiquity of wireless networks, a STA 104 may have the opportunity to select one of many BSSs within range of the STA 104 or to select among multiple APs 102 that together form an extended service set (ESS) including multiple connected BSSs. An extended network station associated with the WLAN 100 may be connected to a wired or wireless distribution system that may allow multiple APs 102 to be connected in such an ESS. As such, a STA 104 can be covered by more than one AP 102 and can associate with different APs 102 at different times for different transmissions. Additionally, after association with an AP 102, a STA 104 also may periodically scan its surroundings to find a more suitable AP 102 with which to associate. For example, a STA 104 that is moving relative to its associated AP 102 may perform a "roaming" scan to find another AP 102 having more desirable network characteristics such as a greater received signal strength indicator (RSSI) or a reduced traffic load.

In some implementations, STAs 104 may form networks without APs 102 or other equipment other than the STAs 104 themselves. One example of such a network is an ad hoc network (or wireless ad hoc network). Ad hoc networks may alternatively be referred to as mesh networks or P2P networks. In some implementations, ad hoc networks may be implemented within a larger wireless network such as the WLAN 100. In such examples, while the STAs 104 may be capable of communicating with each other through the AP 102 using communication links 106, STAs 104 also can communicate directly with each other via direct wireless communication links 110. Additionally, two STAs 104 may communicate via a direct communication link 110 regardless of whether both STAs 104 are associated with and served by the same AP 102. In such an ad hoc system, one or more of the STAs 104 may assume the role filled by the AP 102 in a BSS. Such a STA 104 may be referred to as a group owner (GO) and may coordinate transmissions within the ad hoc network. Examples of direct wireless communication links 110 include Wi-Fi Direct connections, connections established by using a Wi-Fi Tunneled Direct Link Setup (TDLS) link, and other P2P group connections.

The APs 102 and STAs 104 may function and communicate (via the respective communication links 106) according to one or more of the IEEE 802.11 family of wireless communication protocol standards. These standards define the WLAN radio and baseband protocols for the PHY and MAC layers. The APs 102 and STAs 104 transmit and receive wireless communications (hereinafter also referred to as "Wi-Fi communications" or "wireless packets") to and from one another in the form of PHY protocol data units (PPDUs). The APs 102 and STAs 104 in the WLAN 100 may transmit PPDUs over an unlicensed spectrum, which may be a portion of spectrum that includes frequency bands traditionally used by Wi-Fi technology, such as the 2.4 GHz band, the 5 GHz band, the 60 GHz band, the 3.6 GHz band, and the 900 MHz band. Some implementations of the APs 102 and STAs 104 described herein also may communicate in other frequency bands, such as the 5.9 GHZ and the 6 GHz bands, which may support both licensed and unlicensed communications. The APs 102 and STAs 104 also can communicate over other frequency bands such as shared licensed frequency bands, where multiple operators may have a license to operate in the same or overlapping frequency band or bands.

Each of the frequency bands may include multiple subbands or frequency channels. For example, PPDUs conforming to the IEEE 802.11n, 802.11ac, 802.11ax and 802.11be standard amendments may be transmitted over the 2.4 GHZ, 5 GHz or 6 GHz bands, each of which is divided into multiple 20 MHz channels. As such, these PPDUs are transmitted over a physical channel having a minimum bandwidth of 20 MHz, but larger channels can be formed through channel bonding. For example, PPDUs may be transmitted over physical channels having bandwidths of 40 MHZ, 80 MHz, 160 or 320 MHz by bonding together multiple 20 MHz channels.

Each PPDU is a composite structure that includes a PHY preamble and a payload in the form of a PHY service data unit (PSDU). The information provided in the preamble may be used by a receiving device to decode the subsequent data in the PSDU. In instances in which PPDUs are transmitted over a bonded channel, the preamble fields may be duplicated and transmitted in each of the multiple component channels. The PHY preamble may include both a legacy portion (or "legacy preamble") and a non-legacy portion (or "non-legacy preamble"). The legacy preamble may be used for packet detection, automatic gain control and channel estimation, among other uses. The legacy preamble also may generally be used to maintain compatibility with legacy devices. The format of, coding of, and information provided in the non-legacy portion of the preamble is associated with the particular IEEE 802.11 protocol to be used to transmit the payload.

The WLAN 100 may support P2P TWT for communications between peer devices on a particular channel. The STA 104 can negotiate the terms (such as the scheduling and duration) of the TWT agreement with the AP 102, and the AP 102 may conclude the negotiation process by indicating acceptance or rejection of a proposed (such as by transmitting a Channel Usage response frame that includes an "Accept" or "Reject" indicator, or an alternate/suggested parameter, within a TWT element). Upon completion of a successful negotiation and setup of the TWT Agreement, the AP 102 may assume the STA 104 is unavailable (for example, in a doze state) during subsequent P2P TWT SPs, unless the STA 104 sends a frame to the AP 102 during the P2P TWT SP.

Each TWT element carried in a TWT Elements field may include a single Individual TWT Parameter Set field. A TWT Group Assignment subfield of the Individual TWT Parameter Set field may be set to zero. A Responder PM Mode subfield, a Trigger subfield, a Flow Type subfield, and a TWT Channel subfield of the Individual TWT Parameter Set field may be reserved. To indicate that a non-AP STA 104 is unavailable for transmissions with an associated AP 102 during a P2P TWT agreement, the non-AP STA 104 may set the Flow Type subfield in the TWT element to 0 in a Channel Usage Request (such as the Channel Usage Request frame 304 shown and described with reference to FIG. 3). Alternatively, the non-AP STA 104 may indicate unavailability by setting the Flow Type subfield to 1.

A non-AP STA 104 may indicate the lifetime of a requested P2P TWT agreement in the Timeout Interval Value field of a Timeout Interval Element (TIE) which the non-AP STA 104 includes in a Channel Usage Request frame (such as the Channel Usage Request frame 304 shown and described with reference to FIG. 3), and may set the corresponding Timeout Interval Type field to 5. An AP 102 that successfully sets up a P2P TWT agreement after receiving a Channel Usage Request frame with a TWT Elements field from a non-AP STA 104 may indicate the lifetime of the P2P TWT agreement for the corresponding TWT element(s) in the Timeout Interval Value field of a TIE in a Channel Usage Response frame (such as the Channel Usage Response frame 306 shown and described with reference to FIG. 3), and may set the corresponding Timeout Interval Type field to 5. The TIE may be used to indicate, within the Channel Usage Request and Response frames, how many time units (TUs) the P2P TWT agreement will occupy. In particular, setting the Timeout Interval Type field to 5 may indicate the number of TUs in the lifetime of the P2P TWT agreement.

An AP 102 that successfully sets up a P2P TWT agreement may assume the non-AP STA 104 is in a PS mode and doze state at the start of a P2P TWT SP (such as the P2P TWT SP 302 shown and described with reference to FIG. 3), and may assume the non-AP STA 104 will return to a power management mode at the end of the P2P TWT SP if the Flow Type subfield carried in the TWT element of the Channel Usage Response frame concluding the P2P TWT agreement is set to 0, unless the AP 102 receives a frame addressed to the AP 102 from the non-AP STA 104 within a time period that overlaps with the P2P TWT SP. Otherwise, if the Flow Type subfield carried in the TWT element of the Channel Usage Response frame concluding the P2P TWT agreement is set to 1, the AP 102 may assume that the non-AP STA 104 will remain in power management mode before the P2P TWT SP, or that the non-AP STA 104 will update its power management mode, subject to any other TWT setup (such as an Individual TWT or Broadcast TWT) that is overlapping in time with the P2P TWT.

The STA 104 can notify the AP 102 of its unavailability during the P2P TWT SP. The AP 102 may have deterministic information about client unavailability that can be used to avoid interruptions of the P2P channel and simplify scheduling at the AP 102. The STA 104 may be configured to or otherwise capable of using various communication modes for P2P TWT. Mode 0 may be associated with a non-infrastructure BSS, Mode 1 may be associated with an off-channel TDLS direct link, and Mode 2 may be associated with a non-infrastructure BSS on a dedicated P2P channel. The STA 104 can use Mode 3 (such as a P2P link indication) in the Channel Usage Request frame without a Channel Entry field. The AP 102 can acknowledge the unavailability of the STA 104 by sending a Channel Usage Response frame. The AP 102 may assume the STA 104 is unavailable (for example, in a doze state) during the P2P TWT SP unless the STA sends a frame to the AP 102 during the P2P TWT SP.

In some implementations, a first wireless device (such as one of the STAs 104) may receive first scheduling information associated with a first TWT agreement (such as a P2P TWT agreement) associated with one or more recurring time periods during which the first wireless device is capable of performing P2P communications with a second wireless device (such as a client device or a different STA 104). The first wireless device also may receive second scheduling information associated with a second TWT agreement (such as an individual, broadcast, or restricted TWT agreement) associated with one or more recurring time periods during which the first wireless device is capable of communicating with a third wireless device (such as the AP 102) in accordance with a second communication mode (such as an AP mode). The first wireless device may transmit an indication of an availability schedule associated with the first wireless device to resolve an overlap between the first set of one or more recurring time periods and the second set of one or more recurring time periods. Although described in the context of TWT, the overlap resolution techniques disclosed herein are not limited to TWT, and can be applied to other IEEE, Wi-Fi Aware (WFA), Wi-Fi Direct, or proprietary power saving protocols used for P2P communications.

Figure 2:
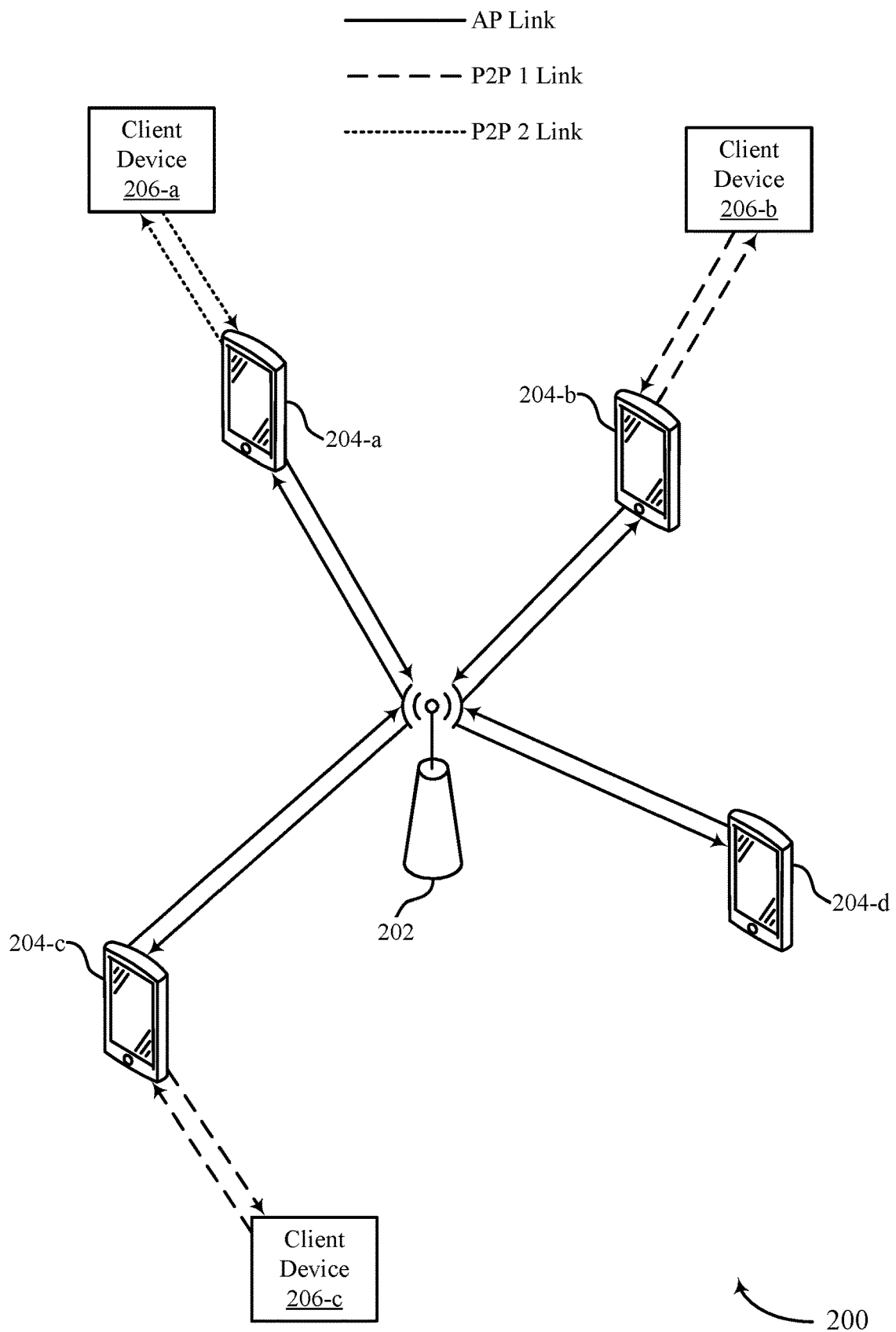
FIG. 2 shows an example network diagram that supports target wake time (TWT) coordination techniques.

FIG. 2 shows an example of a network diagram 200 that supports TWT coordination techniques. The network diagram 200 may implement or be implemented by one or more aspects of the WLAN 100. For example, the network diagram 200 includes an AP 202, which may be an example of a wireless AP, such as the AP 102 shown and described with reference to FIG. 1. The network diagram 200 also includes a STA 204-a, a STA 204-b, a STA 204-c, and a STA 204-d, which may be examples of wireless STAs, such as the STAs 104 shown and described with reference to FIG. 1. Additionally, the network diagram 200 includes a client device 206-a, a client device 206-b, a client device 206-c, and a client device 206-d (also referred to as P2P devices), which may be examples of XR devices, wearable devices, or other wireless STAs (such as other examples of the STAs 104 shown and described with reference to FIG. 1). The client devices 206 may communicate with the STAs 204 via a set of one or more P2P links (denoted as P2P1 Link and P2P2 Link), and the AP 202 may communicate with the STAs 204 via a set of one or more AP links (denoted as AP link).

As depicted in the example of FIG. 2, the STA 204-a may communicate with the AP 202 via the AP link. Additionally, or alternatively, the STA 204-a may communicate with a client device 206-a (for example, an XR device) via a second communication link (such as a P2P channel). In some implementations, to conserve power, the STA 204-a may periodically transition from an active mode to a PS mode in accordance with an individual TWT agreement, a broadcast TWT agreement, or a restricted TWT agreement between the AP 202 and the STA 204-a. Accordingly, the STA 204-a may enter a PS mode until the start of a TWT SP, at which point the STA 204-a may switch to an awake state (or an active mode) and exchange one or more frames with the AP 202 via the first communication link.

In some implementations, however, the STA 204-a also may be configured with a P2P TWT agreement between the STA 204-a and the client device 206-a. In some implementations, P2P TWT may support at least three distinct modes, namely, Mode 0 (non-infrastructure BSS), Mode 1 (Off-channel TDLS direct link), and Mode 2 (non-infrastructure BSS on a dedicated P2P channel).

If, for example, a first SP (also referred to as a recurring time period) associated with a first TWT agreement (such as the P2P agreement) overlaps with a second SP associated with a second TWT agreement (such as the individual TWT agreement, the broadcast TWT agreement, or the restricted TWT agreement), it may be unclear whether the STA 204-a should comply with or otherwise adhere to the first TWT agreement or the second TWT agreement. Consequently, the AP 202 may be unable to determine whether the STA 204-a will be available during the first SP, and the client device 206-a may be unable to determine whether the STA 204-a will be available during the second SP.

If the STA 204-a determines that the first SP associated with the first TWT agreement (between the STA 204-a and the client device 206-a) overlaps with the second SP associated with the second TWT agreement (between the STA 204-a and the AP 202), the STA 204-a may resolve the overlap according to one or more overlap resolution schemes by updating one or both of the first TWT agreement or the second TWT agreement, prioritizing the first TWT agreement over the second TWT agreement (or vice versa), terminating the first TWT agreement or the second TWT agreement, or indicating to the AP 202 or the client device 206-a that the STA 204-a will be available during one or both of the first SP or the second SP.

In some implementations, the STA 204-a may transmit one or more frames that indicate an availability schedule of the STA 204-a. The availability schedule may indicate whether the STA 204-a intends to be available during the first SP, the second SP, or both. The one or more frames also may indicate a time duration for which the availability schedule is valid, a request for resources to use during the first SP or the second SP, or a combination thereof. The STA 204-a may provide the availability schedule to the AP 202 and the client device 206-a via static signaling (such as during a setup phase of the TWT agreement) or dynamic signaling. In some implementations, the availability schedule may be provided in frame (such as a management frame, a Quality of Service (QOS) Data frame, or a QoS Null frame) or a frame header (such as the header of a management frame, a QoS Data frame, or a QoS Null frame). For example, the availability schedule may be provided in an A-Control field of a MAC frame header.

By configuring the STA 204-a to provide availability information (also referred to as an availability schedule) to the AP 202 and the client device 206-a, the described techniques may promote greater coexistence between devices, more efficient utilization of communication resources, lower resource overhead, and greater power savings. For example, if the AP 202 receives an indication that the STA 204-a will be available during an upcoming individual, broadcast, or restricted TWT SP that overlaps with a P2P TWT SP, the AP 202 can transmit DL BUs to the STA 204-a during the upcoming TWT SP, thereby promoting higher throughput, reduced latency, and improved device coordination. Similarly, if the client device 206-a receives an indication that the STA 204-a will be unavailable during an upcoming P2P TWT SP, the client device 206-*a* can skip the P2P TWT SP and transition to (or remain in) a PS mode.

Figure 3:
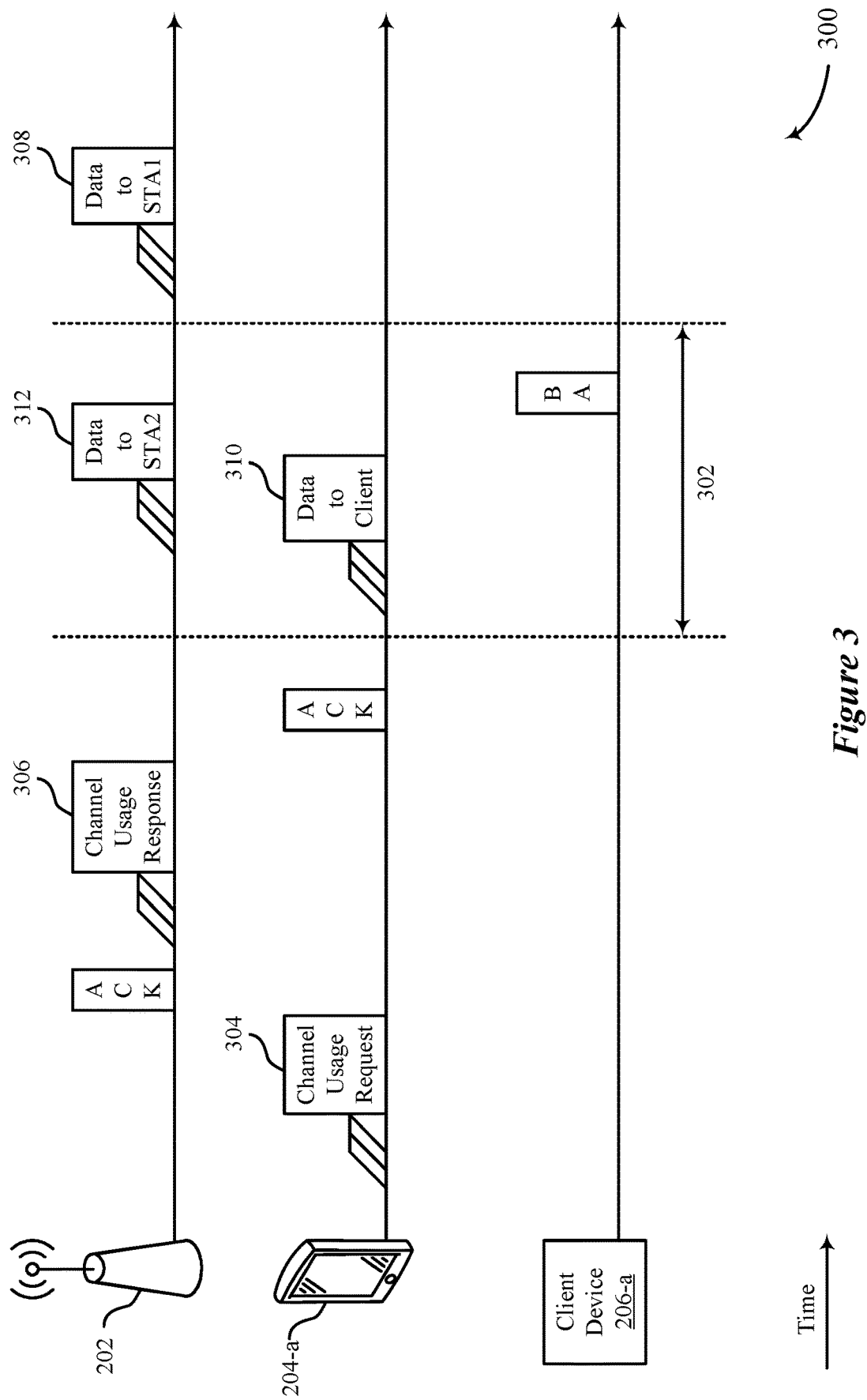
FIG. 3 shows an example communication timeline that supports TWT coordination techniques.

FIG. 3 shows an example of a communication timeline 300 that supports TWT coordination techniques. The communication timeline 300 may implement or be implemented by aspects of the WLAN 100 or the network diagram 200. For example, the communication timeline 300 includes the AP 202, the STA 204-*a*, and the client device 206-*a* described with reference to FIG. 2. As depicted in the communication timeline 300, the STA 204-*a* may transmit data 310 to the client device 206-*a* during a P2P TWT SP 302 in accordance with a P2P TWT agreement between the STA 204-*a* and the client device 206-*a*. The AP 202 may assume the STA 204-*a* is unavailable during the P2P TWP SP 302 unless the AP 202 receives a frame from the STA 204-*a* during the P2P TWT SP 302. In some implementations, the AP 202 may transmit data 312 to another STA (denoted as STA2) while the STA 204-*a* (denoted as STA1) is unavailable.

The STA 204-*a* and the client device 206-*a* may support P2P communications. The AP 202 may assist or manage P2P communications by recommending different channels or time slots for P2P transmissions (such as between the STA 204-*a* and the client device 206-*a*) to promote coexistence between P2P links and AP links. In some implementations, the STA 204-*a* and the client device 206-*a* may support a P2P TWT (also referred to as off-channel TWT) according to defined Channel Usage Procedures, and the Channel Usage Procedures may define signaling by which the STA 204-*a* can request (such as via a Probe Request), and the AP 202 can provide (such as via a Probe Response), a set of one or more recommend P2P channels for use by the STA 204-*a*. The AP 202 also set up a P2P TWT agreement between the STA 204-*a* and the client device 206-*a*. In connection with the P2P TWT agreement, the STA 204-*a* and the client device 206-*a* may share a common resource pool and a defined number (such as up to 8) flow identifiers. Under the terms of the P2P TWT agreement, the AP 202 may assume the STA 204-*a* is unavailable (for example, in a doze state) during a P2P TWT SP 302, unless or until the STA 204-*a* sends a frame to the AP 202 during the P2P TWT SP 302.

In some implementations, AP 202 may be unable to determine the PS state of the STA 204-*a* if an individual, broadcast, or restricted TWT SP of the STA 204-*a* may overlap at least partially in time with the P2P TWT SP 302. This overlap may occur if, for example, the STA 204-*a* has an existing P2P TWT schedule and requests to set up an individual, broadcast, or restricted TWT schedule, or if the AP 202 starts announcing a broadcast TWT schedule in which all STAs that support broadcast TWT become associated with the broadcast TWT. In some other scenarios, the individual, broadcast, or restricted TWT schedule may be scheduled before the P2P TWT schedule is configured.

To resolve overlap(s) between a P2P TWT schedule and other TWT schedules (such as an individual, broadcast, or restricted TWT schedule), the STA 204-*a* may be configured to update or tear down a P2P TWT agreement with the client device 206-*a* before setting an individual, broadcast, or restricted TWT agreement with the AP 202. In accordance with resolving the overlap, the STA 204-*a* may indicate its availability or unavailability with respect to one or both of the TWT agreements to the AP 202 on an AP operating channel.

In some other implementations, the STA 204-*a* may be configured to update or tear down an individual, broadcast, or restricted TWT agreement before setting a P2P TWT if the two schedules overlap in time. In some implementations, one of the P2P, individual, broadcast, or restricted TWT SPs may take precedence over the others. For example, when a P2P TWT schedule is setup, the AP 202 may assume the P2P TWT SP 302 takes precedence over other TWT SPs. In other words, the AP 202 may assume the STA 204-*a* is unavailable during the P2P TWT SP 302 until the STA 204-*a* indicates otherwise (for example, by sending a frame to the AP 202 during the P2P TWT SP 302), even if there is an overlapping individual, broadcast, or restricted TWT SP or other PS mechanism indicating that the STA 204-*a* is available.

Alternatively, when a P2P TWT schedule is setup, the AP 202 may assume that an individual, broadcast, or restricted TWT SP takes precedence over other TWT SPs. Accordingly, the AP 202 may assume the STA 204-*a* is available during the individual, broadcast, or restricted TWT SP, even if there is an overlapping P2P TWT SP 302 or other PS mechanism indicating that the STA 204-*a* is available. Although described in the context of P2P TWT schedules, these techniques also are applicable to resolving overlaps between individual, broadcast, or restricted TWT schedules.

In some implementations, a wireless device (such as the STA 204-*a* or the AP 202) can indicate which TWT schedule takes precedence over other TWT schedules. One or more field(s) in a frame can indicate the intended behavior of the wireless device (such as whether the wireless device intends to be available for a given TWT SP). In some implementations, this indication may be provided via static signaling during a setup phase (such as via a TWT Setup frame or TWT Information frame when the STA 204-*a* and the AP 202 negotiate and accept the TWT agreement). In some other implementations, the indication may be provided via dynamic signaling. In some implementations, the indication may be provided in frame (such as a management frame, a QoS Data frame, or a QoS Null frame) or a frame header (such as the header of a management frame, a QoS Data frame, or a QoS Null frame). For example, the indication may be provided in an A-Control field of a MAC frame header. The wireless device also may indicate a time duration for which the intended or expected behavior is valid. The wireless device may convey this information via a Channel Usage Request frame 304 (if the wireless device includes the STA 204-*a*), a Channel Usage Response frame 306 (if the wireless device includes the AP 202), or a static TWT setup frame. One or more reserved fields or field values of these frames may indicate the expected or intended behavior of the wireless device.

In some implementations, the STA 204-*a* can dynamically transmit an indication of the availability of the STA 204-*a* during the P2P TWT SP 302. For example, if the STA 204-*a* has multiple radios and is capable of communicating with the AP 202 in parallel with communicating with the client device 206-*a* (such as a P2P device), the STA 204-*a* may request resources to use during the P2P TWT SP 302, rather than indicating an unavailability of the STA 204-*a*. Some aspects of the subject matter described in this disclosure also may enable wireless devices to resolve conflicts and overlaps between P2P TWT and other PS mechanisms. For example, if the STA 204-*a* is in a doze state of a PS mode and sends a PS-Poll or an unscheduled automatic power save delivery (U-APSD) Trigger frame to the AP 202 and there is an upcoming P2P TWT (where the STA 204-*a* is unavailable), the AP 202 may assume the STA 204-*a* will remain in an awake state after the P2P TWT SP 302 ends (without additional signaling from the STA 204-*a*), provided the STA 204-*a* was in an awake state before the P2P TWT SP 302.

Accordingly, the AP 202 can deliver DL BUs 308 to the STA 204-*a* without receiving additional frames from the STA 204-*a*.

In some other implementations, if the AP 202 receives a PS-Poll or U-APSD Trigger frame from the STA 204-*a* before an upcoming P2P TWT SP 302, the AP 202 may assume the STA 204-*a* will be in a doze state after the P2P TWT SP 302 ends, even if the STA 204-*a* was in an awake state before the P2P TWT SP 302. Accordingly, the AP 202 may wait for another PS-Poll or U-APSD Trigger frame from the STA 204-*a* before transmitting buffered DL frames to the STA 204-*a*. These techniques (including with reference to FIG. 3) also may be used to resolve overlaps between individual TWT agreements, broadcast TWT agreements, restricted TWT agreements, or a combination thereof.

Figure 4:
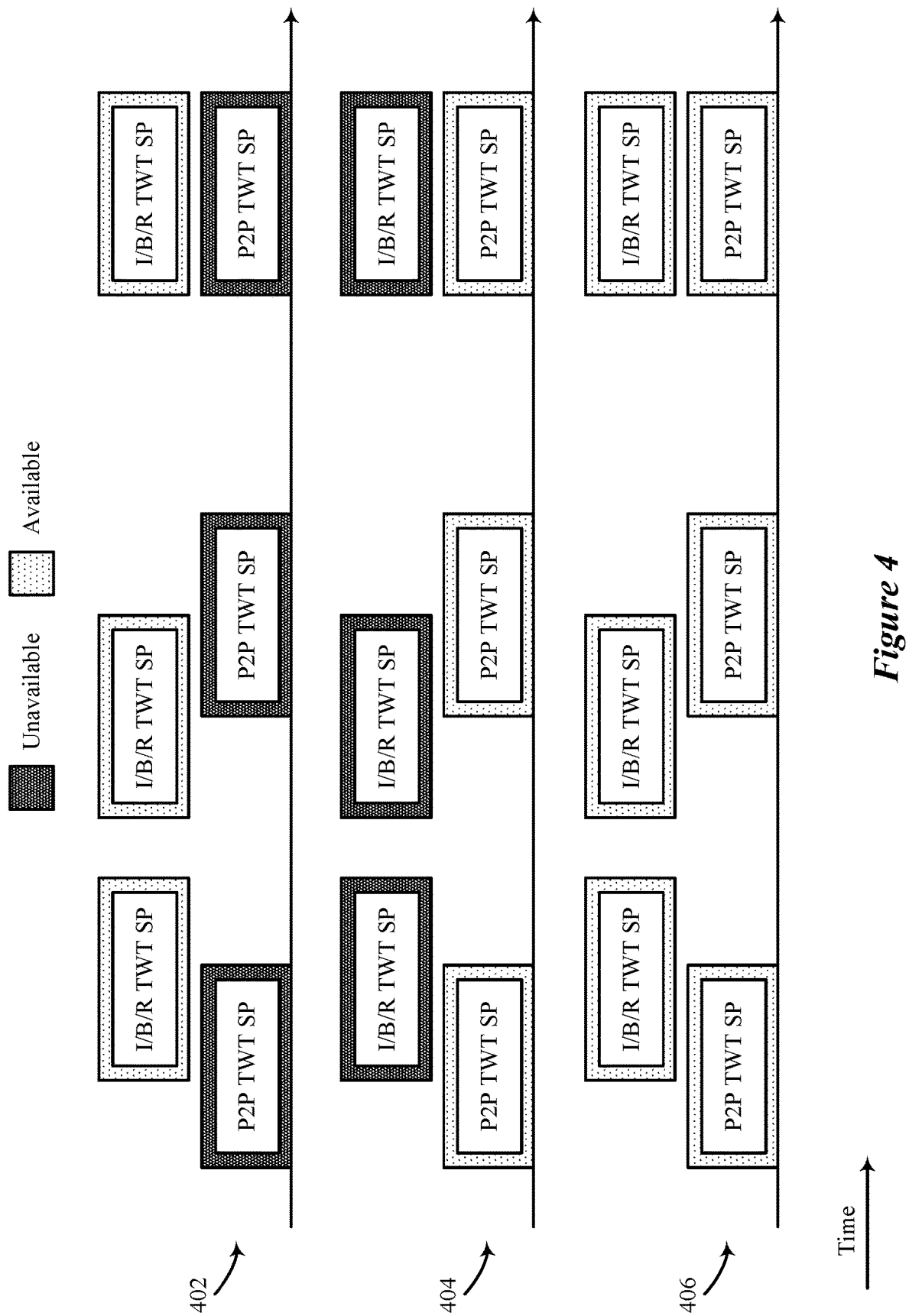
FIG. 4 shows example communication timelines that support TWT coordination techniques.

FIG. 4 shows an example communication timeline 402, an example communication timeline 404, and an example communication timeline 406 that support TWT coordination techniques. The communication timelines 402, 404, and 406 may implement or be implemented by one or more aspects of the WLAN 100, as shown and described with reference to FIG. 1. For example, the communication timelines 402, 404, and 406 may be implemented by a first wireless device, such as one of the STAs 104 shown and described with reference to FIG. 1. In the communication timelines 402, 404, and 406, a first set of one or more SPs associated with a first TWT agreement (such as a P2P TWT agreement) may overlap (in time) with a second set of one or more SPs associated with a second TWT agreement (such as an individual, broadcast, or restricted TWT agreement). In some implementations, the first wireless device may resolve the overlap between the first set of one or more SPs and the second set of one or more SPs by prioritizing one set of one or more SPs over the other.

As described with reference to FIGS. 1-3, an AP may be unable to determine the PS state of a STA if an individual, broadcast, or restricted TWT SP of the STA overlaps with a P2P TWT SP of the STA. This can occur if, for example, the STA has an existing P2P TWT schedule and requests to set up an individual, broadcast, or restricted TWT schedule, or if the AP starts announcing a broadcast TWT schedule (with ID=0) in which all STAs that support broadcast TWT become members of the schedule. In some other scenarios, the individual, broadcast, or restricted TWT schedule may be scheduled before the P2P TWT schedule is configured.

Some aspects of the subject matter described in this disclosure provide for managing the coexistence of different TWT schedules that overlap (partially or fully) in time. For an individual, broadcast, or restricted TWT schedule, a STA can indicate its availability to the AP on an AP operating channel. For a P2P TWT schedule, the STA indicate its unavailability to the AP on the AP operating channel. To resolve overlap(s) between a P2P TWT schedule and other TWT schedules (such as an individual, broadcast, or restricted TWT schedule), a wireless device (such as a STA, AP, or client) may be configured to update or tear down a P2P TWT agreement before setting an individual, broadcast, or restricted TWT agreement with another wireless device.

In some other implementations, a wireless device may be configured to update or tear down an individual, broadcast, or restricted TWT agreement before setting a P2P TWT with another wireless device if the two schedules overlap in time. In some implementations, one of the P2P TWT SPs or other types of TWT SPs (such as individual, broadcast, or restricted TWT SPs) may take precedence over the other. For example, as depicted in the communication timeline 404, an AP may assume that the P2P TWT SPs takes precedence over other TWT SPs. In other words, the AP may assume that the client or STA is unavailable during the P2P TWT SP until the STA indicates otherwise (for example, by sending a frame to the AP during the P2P TWT SP), even if there is an overlapping individual, broadcast, or restricted TWT SP or other PS mechanism indicating that the STA is available.

In some other implementations, the AP may assume that an individual, broadcast, or restricted TWT SP takes precedence over other TWT SPs, as depicted in the communication timeline 402. Accordingly, the AP may assume the client or STA is available during the individual, broadcast, or restricted TWT SP, even if there is an overlapping P2P TWT SP or other PS mechanism indicating that the STA or client is available. Although described in the context of P2P TWT schedules, these techniques are also applicable to resolving overlaps between individual, broadcast, or restricted TWT schedules.

In some implementations, a STA (such as a client or AP) can indicate which TWT schedule takes precedence over other TWT schedules. One or more field(s) in a frame can indicate the intended behavior of the STA (such as whether the STA intends to be available for a given TWT SP). In some implementations, this indication may be provided via static signaling during a setup phase. In some other implementations, the indication may be provided via dynamic signaling, such as a management frame, TWT Information frame, or TWT Setup frame. In some implementations, the indication may be provided in frame (such as a management frame, a QoS Data frame, or a QoS Null frame) or a frame header (such as the header of a management frame, a QoS Data frame, or a QoS Null frame). For example, the indication may be provided in an A-Control field of a MAC frame header. The STA also may indicate a time duration for which the intended or expected behavior is valid. The STA may convey this information via a Channel Usage Request/Response frame or a static TWT setup frame. One or more reserved fields or field values may indicate the expected or intended behavior of the STA.

In some implementations, a client can indicate its availability during a P2P TWT SP. For example, if the client has multiple radios and is capable of communicating with an AP in parallel with a P2P device, the client may request resources to use during the P2P TWT SP, rather than indicating an unavailability of the client. In such implementations, the client can use a first set of one or more resources to communicate with the P2P device during the P2P TWT SP and a second set of one or more resources to communicate with the AP during the overlapping individual, broadcast, or restricted TWT SP (as depicted in the communication timeline 406), thereby enabling the client to be available in both TWT SPs. Some aspects of the subject matter described in this disclosure also may enable wireless devices to resolve conflicts and overlaps between P2P TWT and other PS mechanisms. For example, if a client in a doze state of a PS mode sends a PS-Poll or U-APSD Trigger frame to an AP and there is an upcoming P2P TWT (where the client is unavailable), the AP may assume the client will remain in an awake state after the P2P TWT SP ends (without additional signaling from the client), provided the client was in an awake state before the P2P TWT SP. Accordingly, the AP can deliver DL BUs to the client without receiving additional frames from the client.

In some other implementations, if the AP receives a PS-Poll or U-APSD Trigger frame from a client before an upcoming P2P TWT SP, the AP may assume the client will be in a doze state after the P2P TWT SP ends, even if the client was in an awake state before the P2P TWT SP.

Accordingly, the AP may wait for another PS-Poll or U-APSD Trigger frame from the client before transmitting buffered DL frames to the client. These techniques (including with reference to FIG. 4) also can be used to resolve overlaps between individual TWT agreements, broadcast TWT agreements, restricted TWT agreements, or a combination thereof.

Although explained in the context of the STA 204-*a*, the described TWT SP overlap resolution schemes also apply to AP-to-AP communications, such as Infra-AP to GO communications, root AP to relay AP communications, and relay AP to root AP communications. Likewise, although some implementations are described in the context of resolving overlaps between P2P TWT SPs and individual, broadcast, or restricted TWT SPs, the described techniques can be used to resolve overlaps between individual, broadcast, or restricted TWT SPs.

Figure 5:
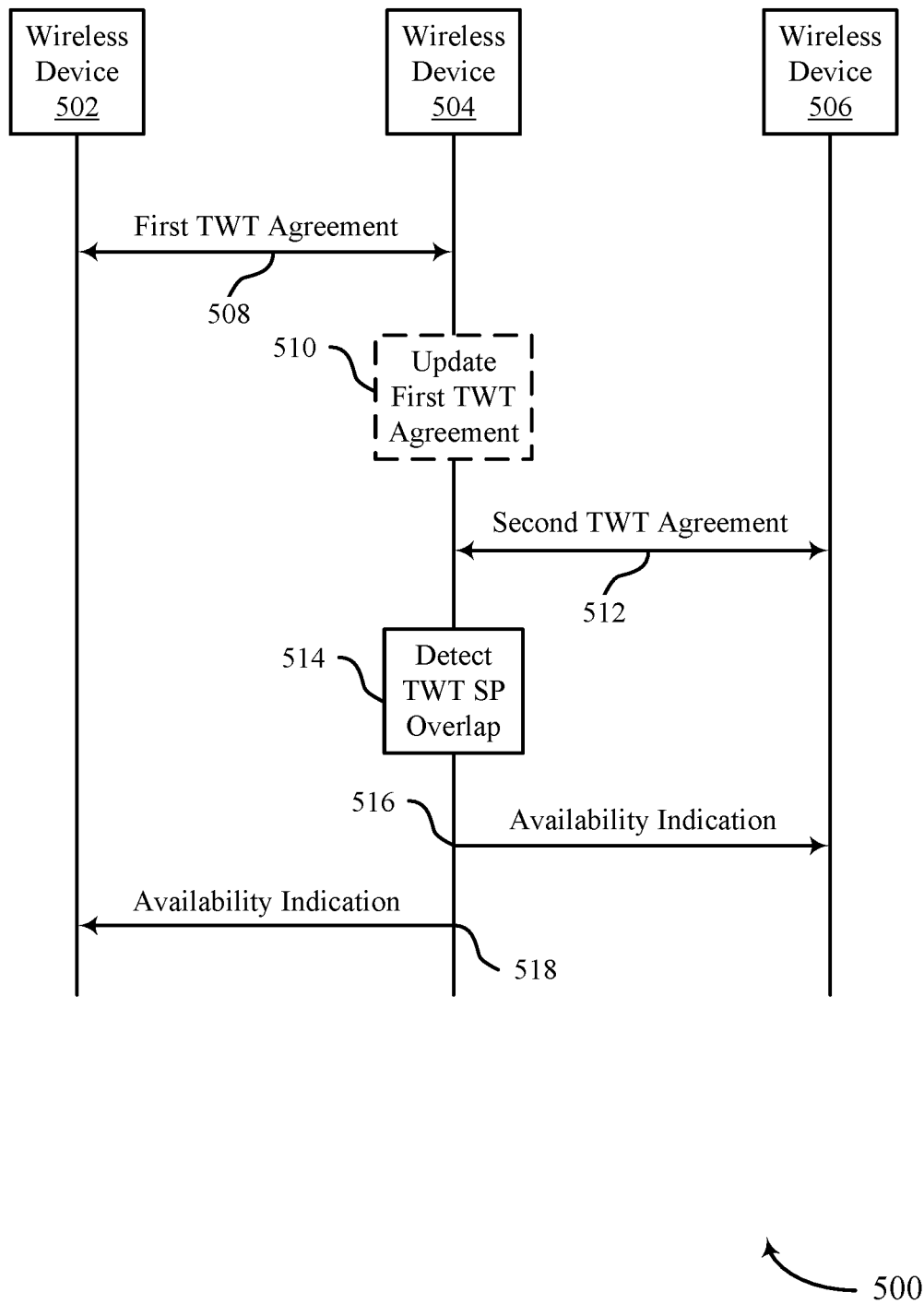
FIG. 5 shows an example process flow that supports TWT coordination techniques.

FIG. 5 shows an example process flow 500 performable by one or more wireless devices that support TWT coordination techniques. The process flow 500 may implement or be implemented by aspects of the WLAN 100, as shown and described with reference to FIG. 1. For example, the process flow 500 includes a wireless device 504 (such as a first wireless device) and a wireless device 502 (such as a second wireless device), both of which may be examples of aspects of a wireless STA, such as the STAs 104 shown and described with reference to FIG. 1. Likewise, the process flow 500 includes a wireless device 506 (such as a third wireless device), which may be an example of aspects of a wireless AP, such as the AP 102 shown and described with reference to FIG. 1. In the following description of the process flow 500, operations between the wireless device 502, the wireless device 504, and the wireless device 506 may be added, omitted, or performed in a different order (with respect to the order shown in the example of FIG. 5).

At 508, the wireless device 504 may establish a first TWT agreement (such as a P2P TWT agreement) with the wireless device 502. For example, the wireless device 504 may transmit or receive first scheduling information associated with a first set of one or more recurring time periods (such as TWT SPs) during which the wireless device 504 is capable of communicating with the wireless device 502 in accordance with a first communication mode. In some implementations, the first communication mode may include a P2P communication mode associated with communications between a STA and a client device. In some other implementations, the first communication mode may include an AP-to-AP communication mode associated with communications between two infra-APs, or between two APs in a relay scenario (such as a root AP to relay AP or a relay AP to root AP).

In some implementations, at 510, the wireless device 504 may update or terminate the first TWT agreement with the wireless device 502 before configuring or otherwise establishing a second TWT agreement with the wireless device 506. For example, the wireless device 504 may be configured to update or tear down a P2P TWT agreement with a client device (such as the wireless device 502) before setting up an individual, broadcast, or restricted TWT agreement with an AP (such as the wireless device 506).

At 512, the wireless device 504 may establish a second TWT agreement (such as an individual, broadcast, or restricted TWT agreement) with the wireless device 506. For example, the wireless device 504 may transmit or receive second scheduling information associated with a second set of one or more recurring time periods (such as TWT SPs) during which the wireless device 504 is capable of communicating with the wireless device 506 in accordance with a second communication mode. In some implementations, the second communication mode may include an infra-AP communication mode associated with communications between a STA and an AP. In some other implementations, the second communication mode may be associated with communications between an infra-AP and a GO (such as a Wi-Fi direct mode).

Additionally, or alternatively, the wireless device 504 may be configured to update or tear down an individual, broadcast, or restricted TWT agreement with an AP before setting up a P2P TWT agreement with a client device. At 514, the wireless device 504 may determine that a first time period associated with the first TWT agreement (such as a first TWT SP) overlaps with at least a portion of a second time period associated with the second TWT agreement (such as a second TWT SP). The overlap between the first time period may include a full overlap or a partial overlap, as shown and described with reference to FIG. 4.

At 516 and 518, the wireless device 504 may transmit an indication of an availability schedule associated with the wireless device 504. The availability schedule provided by the wireless device 504 may help resolve the overlap between the first time period and the second time period. In some implementations, the availability schedule of the wireless device 504 may indicate whether the wireless device 504 is available to communicate with the wireless device 502 (using the first communication mode) during the first time period. Additionally, or alternatively, the availability schedule of the wireless device 504 may indicate whether the wireless device 504 is available to communicate with the wireless device 506 (using the second communication mode) during the second time period. In some implementations, the availability schedule may indicate that the wireless device 504 intends to prioritize the first time period over the second time period (or vice versa), or that the wireless device 504 intends to prioritize the first TWT agreement over the second TWT agreement (or vice versa).

In some implementations, to provide the indication of the availability schedule to one or both of the wireless device 502 or the wireless device 506, the wireless device 504 may transmit one or more of a channel usage request frame or a TWT setup frame that indicates the availability schedule, where one or more reserved fields or field values of the channel usage request frame or the TWT setup frame indicate whether the first wireless device intends to be available during the first time period, the second time period, or both. The indication of the availability schedule may be provided via static signaling associated with a setup phase (in which the wireless device 504 configures the first TWT agreement and the second TWT agreement) or via dynamic signaling that includes one or more of a management frame, a TWT information frame, or a TWT setup frame. In some implementations, the indication may be provided in frame (such as a management frame, a QoS Data frame, or a QoS Null frame) or a frame header (such as the header of a management frame, a QoS Data frame, or a QoS Null frame). For example, the indication may be provided in an A-Control field of a MAC frame header. In some implementations, the availability schedule also may indicate a time period for which the availability schedule of the wireless device 504 is valid.

The wireless device 504 may communicate with one or both of the wireless device 502 or the wireless device 506 during one or both of the first time period or the second time period in accordance with the availability schedule provided at 516 and 518. For example, the wireless device 504 may transition from a doze state (of a PS mode) to an awake state and communicate with the wireless device 502 (in accordance with the first communication mode) during the first time period associated with the first TWT agreement. Additionally, or alternatively, the wireless device 504 may transition to an awake state and communicate with the wireless device 506 (in accordance with the second communication mode) during the second time period associated with the second TWT. If, for example, the wireless device 504 is configured with more than one radio (such as an RF chain), the wireless device 504 may be capable of communicating with the wireless device 502 and the wireless device 506 in parallel using different radios.

Figure 6:
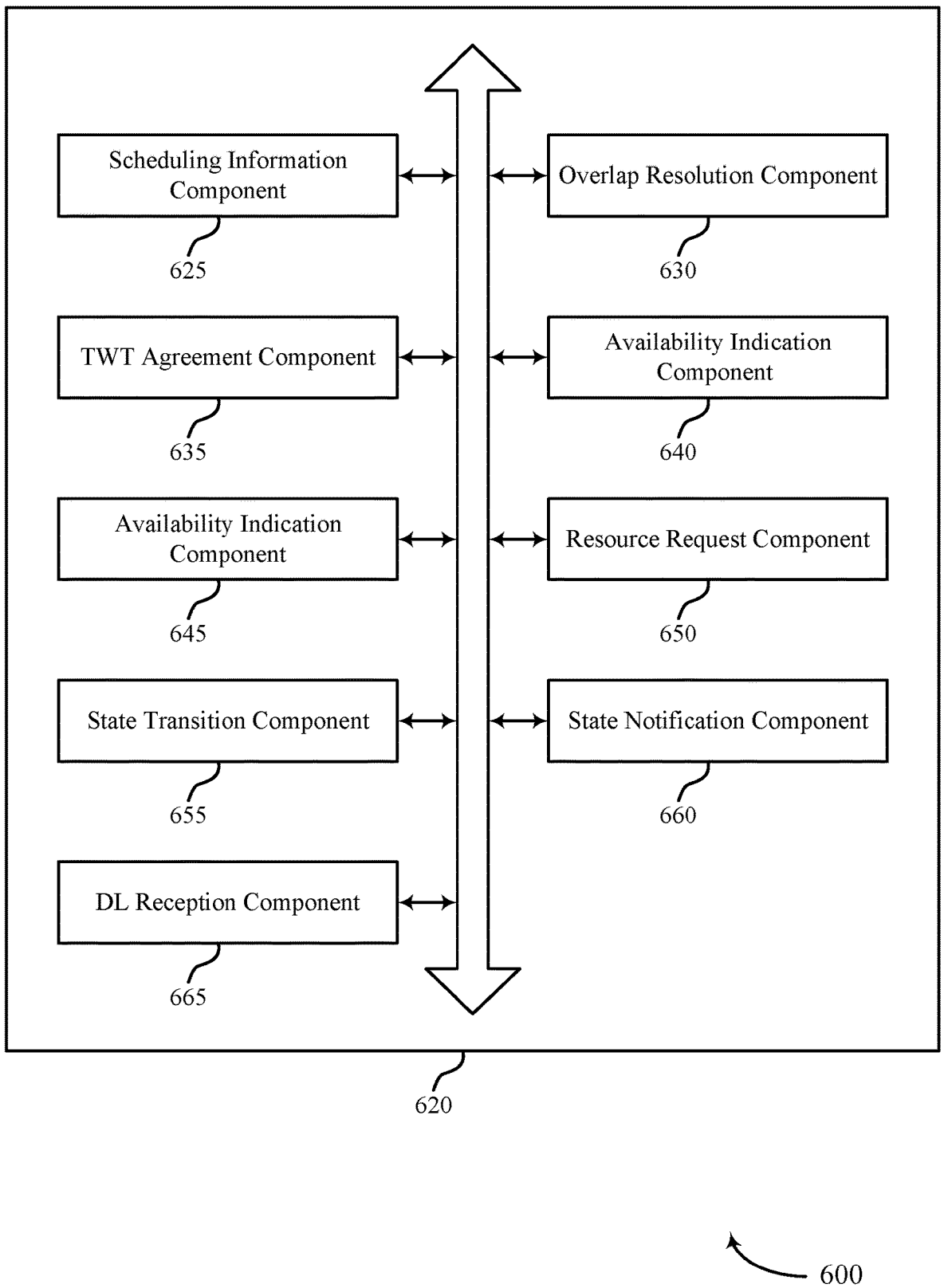
FIG. 6 shows a block diagram of an example wireless communication device that supports TWT coordination techniques.

FIG. 6 shows a block diagram 600 of a first wireless device 620 that supports TWT coordination techniques. The first wireless device 620 may be an example of aspects of a first wireless device as described with reference to FIGS. 1-5. The first wireless device 620, or various components thereof, may be an example of means for performing various aspects of TWT SP coordination. For example, the first wireless device 620 may include a scheduling information component 625, an overlap resolution component 630, a TWT agreement component 635, an availability indication component 640, an availability indication component 645, a resource request component 650, a state transition component 655, a state notification component 660, a DL reception component 665, or any combination thereof. Each of these components, or components or subcomponents thereof (for example, one or more processors, one or more memories), may communicate, directly or indirectly, with one another (for example, via one or more buses).

The first wireless device 620 may include one or more chips, SoCs, chipsets, packages or devices that individually or collectively constitute or comprise a processing system. The processing system includes processor (or "processing") circuitry in the form of one or multiple processors, microprocessors, processing units (such as central processing units (CPUs), graphics processing units (GPUs) or digital signal processors (DSPs)), processing blocks, application-specific integrated circuits (ASIC), programmable logic devices (PLDs) (such as field programmable gate arrays (FPGAs)), or other discrete gate or transistor logic or circuitry (all of which may be generally referred to herein individually as "processors" or collectively as "the processor" or "the processor circuitry"). One or more of the processors may be individually or collectively configurable or configured to perform various functions or operations described herein.

The processing system may further include memory circuitry in the form of one or more memory devices, memory blocks, memory elements or other discrete gate or transistor logic or circuitry, each of which may include tangible storage media such as random-access memory (RAM) or read-only memory (ROM), or combinations thereof (all of which may be generally referred to herein individually as "memories" or collectively as "the memory" or "the memory circuitry"). One or more of the memories may be coupled with one or more of the processors and may individually or collectively store processor-executable code that, when executed by one or more of the processors, may configure one or more of the processors to perform various functions or operations described herein.

Additionally or alternatively, in some examples, one or more of the processors may be preconfigured to perform various functions or operations described herein without requiring configuration by software. The processing system may further include or be coupled with one or more modems (such as a Wi-Fi (for example, IEEE compliant) modem or a cellular (for example, 3GPP 4G LTE, 5G or 6G compliant) modem). In some implementations, one or more processors of the processing system include or implement one or more of the modems. The processing system may further include or be coupled with multiple radios (collectively "the radio"), multiple RF chains or multiple transceivers, each of which may in turn be coupled with one or more of multiple antennas. In some implementations, one or more processors of the processing system include or implement one or more of the radios, RF chains or transceivers.

The first wireless device 620 may support wireless communication. The scheduling information component 625 is capable of, configured to, or operable to support a means for receiving first scheduling information associated with a first set of one or more recurring time periods during which the first wireless device is capable of communicating with a second wireless device in accordance with a first communication mode. In some implementations, the scheduling information component 625 is capable of, configured to, or operable to support a means for receiving second scheduling information associated with a second set of one or more recurring time periods during which the first wireless device is capable of communicating with a third wireless device in accordance with a second communication mode. The overlap resolution component 630 is capable of, configured to, or operable to support a means for transmitting an indication of an availability schedule associated with the first wireless device in accordance with resolving an overlap between at least a first time period of the first set of one or more recurring time periods and a second time period of the second set of one or more recurring time periods.

In some implementations, the TWT agreement component 635 is capable of, configured to, or operable to support a means for updating or terminating a TWT agreement associated with the first set of one or more recurring time periods or the second set of one or more recurring time periods to resolve the overlap between the first time period and the second time period.

In some implementations, the TWT agreement includes one or more of a P2P TWT agreement, an individual TWT agreement, a broadcast TWT agreement, or a restricted TWT agreement associated with the first set of one or more recurring time periods or the second set of one or more recurring time periods.

In some implementations, the first time period of the first set of one or more recurring time periods associated with the second communication mode is prioritized over the second time period of the second set of one or more recurring time periods associated with the first communication mode in resolving the overlap.

In some implementations, the second time period of the second set of one or more recurring time periods associated with the first communication mode is prioritized over the first time period of the first set of one or more recurring time periods associated with the second communication mode in resolving the overlap.

In some implementations, the availability schedule indicates that the first wireless device is unavailable during the second time period that overlaps with the first time period. In some implementations, the availability schedule indicates that the first wireless device is unavailable during the first time period that overlaps with the second time period.

In some implementations, the availability indication component 640 is capable of, configured to, or operable to support a means for transmitting, during the first time period that overlaps with the second time period, a frame indicating that the first wireless device is available to communicate with the third wireless device using the second communication mode.

In some implementations, the availability indication component 645 is capable of, configured to, or operable to support a means for transmitting, during the second time period that overlaps with the first time period, a frame indicating that the first wireless device is available to communicate with the second wireless device using the first communication mode.

In some implementations, the availability schedule indicates that a first TWT schedule associated with the first set of one or more recurring time periods is prioritized over a second TWT schedule associated with the second set of one or more recurring time periods.

In some implementations, the availability schedule indicates that a second TWT schedule associated with the second set of one or more recurring time periods is prioritized over a first TWT schedule associated with the first set of one or more recurring time periods. In some implementations, the indication of the availability schedule is provided via one or more fields of a frame from the first wireless device.

In some implementations, the indication of the availability schedule is provided via static signaling associated with a setup phase in which one or both of a first periodic communication schedule associated with the first set of one or more recurring time periods or a second periodic communication schedule associated with the second set of one or more recurring time periods is configured for the first wireless device.

In some implementations, the indication of the availability schedule is provided via dynamic signaling that includes one or more of a management frame, a TWT information frame, or a TWT setup frame. In some implementations, the availability schedule includes an indication of a time period for which the availability schedule is valid.

In some implementations, to support transmitting the indication of the availability schedule, the availability indication component 645 is capable of, configured to, or operable to support a means for transmitting one or more of a channel usage request frame or a TWT setup frame that indicates the availability schedule, where one or more reserved fields or field values of the channel usage request frame or the TWT setup frame indicate whether the first wireless device intends to be available during the first time period, the second time period, or both.

In some implementations, the availability schedule indicates an availability of the first wireless device during the first time period, an availability of the first wireless device during the second time period, or both. In some implementations, the first wireless device is capable of using a set of one or more radios to communicate with the second wireless device and the third wireless device in parallel.

In some implementations, the resource request component 650 is capable of, configured to, or operable to support a means for transmitting a request for resources usable for communications between the first wireless device and the third wireless device during the first time period associated with the first communication mode.

In some implementations, the state transition component 655 is capable of, configured to, or operable to support a means for transitioning from a doze state of a PS mode to an awake state of the PS mode to communicate with the second wireless device during the first time period associated with the first communication mode.

In some implementations, the state notification component 660 is capable of, configured to, or operable to support a means for transmitting one or more of a PS-Poll frame or a U-APSD frame to notify the third wireless device that the first wireless device is in the awake state. In some implementations, the DL reception component 665 is capable of, configured to, or operable to support a means for remaining in the awake state after the first time period to receive DL BUs from the third wireless device.

In some implementations, the state transition component 655 is capable of, configured to, or operable to support a means for transitioning from a doze state of a PS mode to an awake state of the PS mode to communicate with the second wireless device during the first time period associated with the first communication mode. In some implementations, the state notification component 660 is capable of, configured to, or operable to support a means for transmitting one or more of a PS-Poll frame or a U-APSD frame after the first time period to notify the third wireless device that the first wireless device is in the awake state. In some implementations, the DL reception component 665 is capable of, configured to, or operable to support a means for receiving one or more DL BUs from the third wireless device in accordance with the second communication mode.

In some implementations, at least a portion of the first time period associated with the first communication mode overlaps in time with the second time period associated with the second communication mode.

Figure 7:
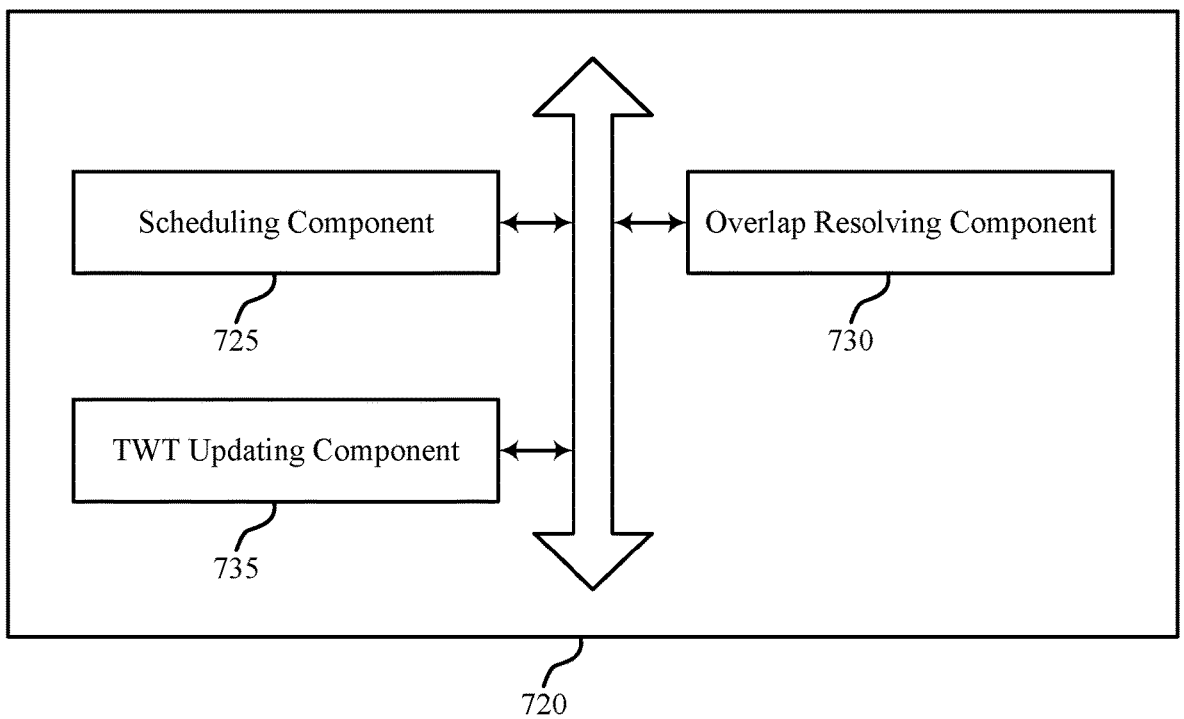
FIG. 7 shows a block diagram of an example wireless communication device that supports TWT coordination techniques.

FIG. 7 shows a block diagram 700 of a third wireless device 720 that supports TWT coordination techniques. The third wireless device 720 may be an example of aspects of a third wireless device as described with reference to FIGS. 1-5. The third wireless device 720, or various components thereof, may be an example of means for performing various aspects of TWT SP coordination. For example, the third wireless device 720 may include a scheduling component 725, an overlap resolving component 730, a TWT updating component 735, or any combination thereof. Each of these components, or components or subcomponents thereof (for example, one or more processors, one or more memories), may communicate, directly or indirectly, with one another (for example, via one or more buses).

The third wireless device 720 may include one or more chips, SoCs, chipsets, packages or devices that individually or collectively constitute or comprise a processing system. The processing system includes processor (or "processing") circuitry in the form of one or multiple processors, microprocessors, processing units (such as CPUs, GPUs or DSPs), processing blocks, ASICs, PLDs (such as FPGAs), or other discrete gate or transistor logic or circuitry (all of which may be generally referred to herein individually as "processors" or collectively as "the processor" or "the processor circuitry"). One or more of the processors may be individually or collectively configurable or configured to perform various functions or operations described herein.

The processing system may further include memory circuitry in the form of one or more memory devices, memory blocks, memory elements or other discrete gate or transistor logic or circuitry, each of which may include tangible storage media such as random-access memory (RAM) or read-only memory (ROM), or combinations thereof (all of which may be generally referred to herein individually as "memories" or collectively as "the memory" or "the memory circuitry"). One or more of the memories may be coupled with one or more of the processors and may individually or collectively store processor-executable code that, when executed by one or more of the processors, may configure one or more of the processors to perform various functions or operations described herein.

Additionally or alternatively, in some examples, one or more of the processors may be preconfigured to perform various functions or operations described herein without requiring configuration by software. The processing system may further include or be coupled with one or more modems (such as a Wi-Fi (for example, IEEE compliant) modem or a cellular (for example, 3GPP 4G LTE, 5G or 6G compliant) modem). In some implementations, one or more processors of the processing system include or implement one or more of the modems. The processing system may further include or be coupled with multiple radios (collectively "the radio"), multiple RF chains or multiple transceivers, each of which may in turn be coupled with one or more of multiple antennas. In some implementations, one or more processors of the processing system include or implement one or more of the radios, RF chains or transceivers.

The third wireless device 720 may support wireless communication. The scheduling component 725 is capable of, configured to, or operable to support a means for receiving first scheduling information associated with a first set of one or more recurring time periods during which a first wireless device is capable of communicating with a second wireless device in accordance with a first communication mode. In some implementations, the scheduling component 725 is capable of, configured to, or operable to support a means for transmitting second scheduling information associated with a second set of one or more recurring time periods during which the first wireless device is capable of communicating with the third wireless device in accordance with a second communication mode. The overlap resolving component 730 is capable of, configured to, or operable to support a means for receiving an indication of an availability schedule associated with the first wireless device in accordance with resolving an overlap between at least a first time period of the first set of one or more recurring time periods and a second time period of the second set of one or more recurring time periods.

In some implementations, the TWT updating component 735 is capable of, configured to, or operable to support a means for updating or terminating a TWT agreement associated with the first set of one or more recurring time periods or the second set of one or more recurring time periods to resolve the overlap between the first time period and the second time period.

In some implementations, the first time period of the first set of one or more recurring time periods associated with the second communication mode is prioritized over the second time period of the second set of one or more recurring time periods associated with the first communication mode in resolving the overlap.

In some implementations, the second time period of the second set of one or more recurring time periods associated with the first communication mode is prioritized over the first time period of the first set of one or more recurring time periods associated with the second communication mode in resolving the overlap.

Figure 8:
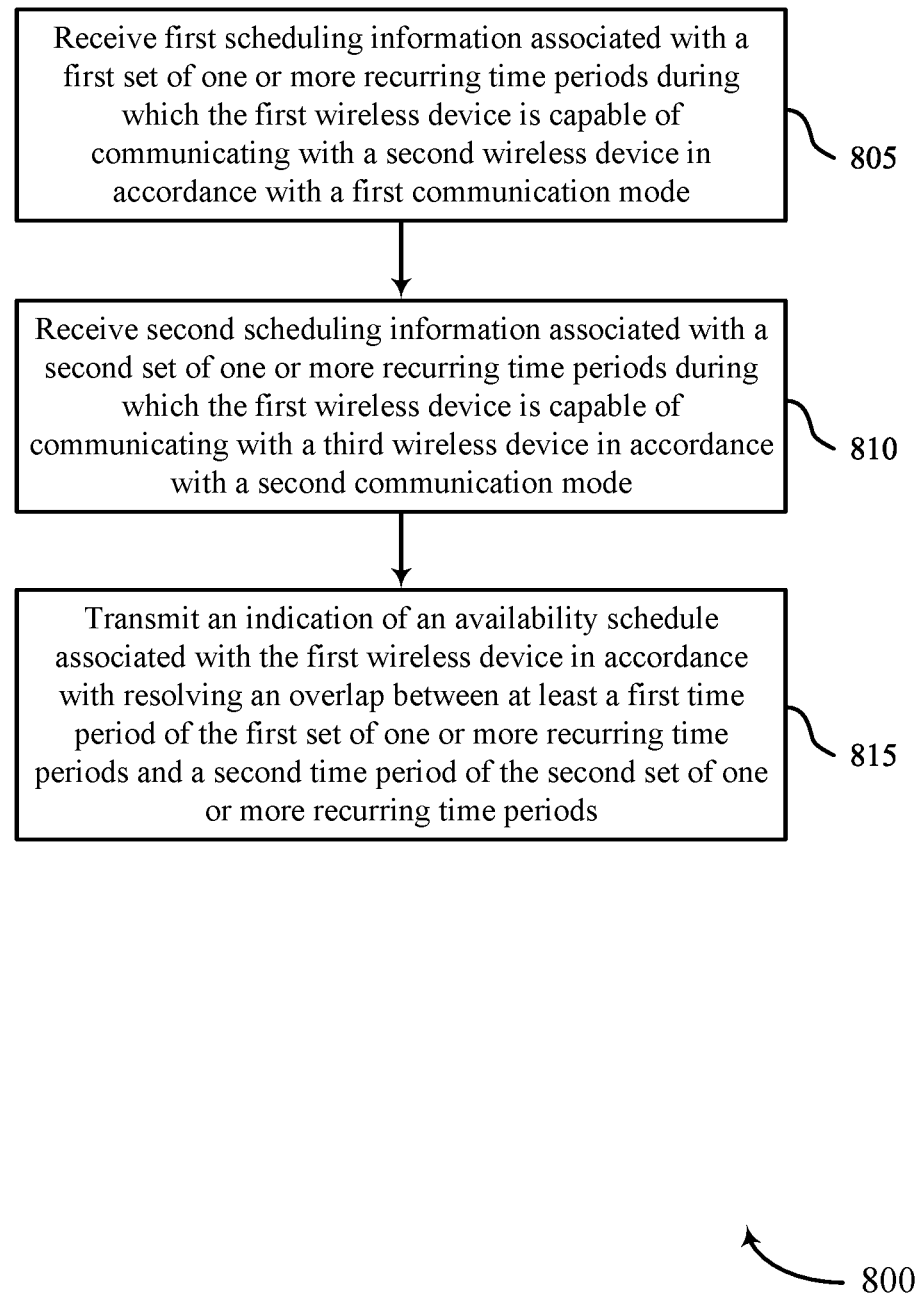
FIGS. 8 and 9 show flowcharts illustrating example processes that support TWT coordination techniques.

FIG. 8 shows a flowchart illustrating a method 800 performable by a wireless device that supports TWT coordination techniques. The operations of the method 800 may be implemented by a first wireless device, such as the wireless device 504 described with reference to FIG. 5. In some implementations, the first wireless device may execute a set of one or more instructions to control the functional elements of the first wireless device to perform the described functions. Additionally, or alternatively, the first wireless device may perform aspects of the described functions using special-purpose hardware.

At 805, the method may include receiving first scheduling information associated with a first set of one or more recurring time periods during which the first wireless device is capable of communicating with a second wireless device in accordance with a first communication mode.

At 810, the method may include receiving second scheduling information associated with a second set of one or more recurring time periods during which the first wireless device is capable of communicating with a third wireless device in accordance with a second communication mode.

At 815, the method may include transmitting an indication of an availability schedule associated with the first wireless device in accordance with resolving an overlap between at least a first time period of the first set of one or more recurring time periods and a second time period of the second set of one or more recurring time periods.

Figure 9:
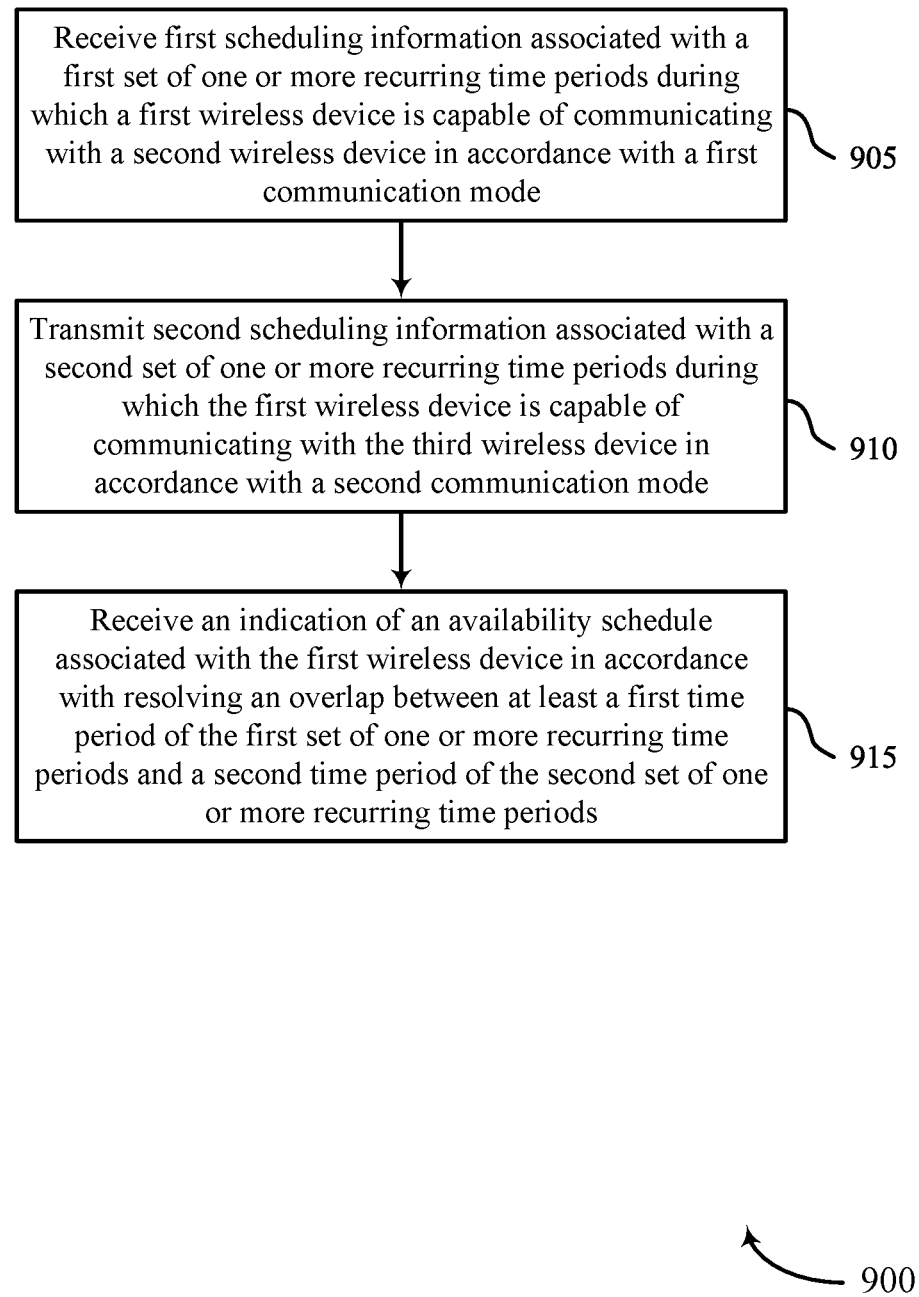

FIG. 9 shows a flowchart illustrating a method 900 performable by a wireless device that supports TWT coordination techniques. The operations of the method 900 may be implemented by a third wireless device, such as the wireless device 506 described with reference to FIG. 5. In some implementations, the third wireless device may execute a set of one or more instructions to control the functional elements of the third wireless device to perform the described functions.

Additionally, or alternatively, the third wireless device may perform aspects of the described functions using special-purpose hardware.

At 905, the method may include receiving first scheduling information associated with a first set of one or more recurring time periods during which a first wireless device is capable of communicating with a second wireless device in accordance with a first communication mode.

At 910, the method may include transmitting second scheduling information associated with a second set of one or more recurring time periods during which the first wireless device is capable of communicating with the third wireless device in accordance with a second communication mode.

At 915, the method may include receiving an indication of an availability schedule associated with the first wireless device in accordance with resolving an overlap between at least a first time period of the first set of one or more recurring time periods and a second time period of the second set of one or more recurring time periods.

Implementation examples are described in the following numbered clauses:

Clause 1: A first wireless device, including: a processing system that includes processor circuitry and memory circuitry that stores code, the processing system configured to cause the first wireless device to: receive first scheduling information associated with a first set of multiple recurring time periods during which the first wireless device is capable of communicating with a second wireless device in accordance with a first communication mode; receive second scheduling information associated with a second set of multiple recurring time periods during which the first wireless device is capable of communicating with a third wireless device in accordance with a second communication mode; and transmit an indication of an availability schedule associated with the first wireless device in accordance with resolving an overlap between at least a first time period of the first set of multiple recurring time periods and a second time period of the second set of multiple recurring time periods.

Clause 2: The first wireless device of clause 1, where the processing system is further configured to cause the first wireless device to: update or terminate a TWT agreement associated with the first set of multiple recurring time periods or the second set of multiple recurring time periods to resolve the overlap between the first time period and the second time period.

Clause 3: The first wireless device of clause 2, where the TWT agreement includes one or more of a P2P TWT agreement, an individual TWT agreement, a broadcast TWT agreement, or a restricted TWT agreement associated with the first set of multiple recurring time periods or the second set of multiple recurring time periods.

Clause 4: The first wireless device of any of clauses 1 through 3, where the first time period of the first set of multiple recurring time periods associated with the second communication mode is prioritized over the second time period of the second set of multiple recurring time periods associated with the first communication mode in resolving the overlap.

Clause 5: The first wireless device of any of clauses 1 through 4, where the second time period of the second set of multiple recurring time periods associated with the first communication mode is prioritized over the first time period of the first set of multiple recurring time periods associated with the second communication mode in resolving the overlap.

Clause 6: The first wireless device of any of clauses 1 through 5, where the availability schedule indicates that the first wireless device is unavailable during the second time period that overlaps with the first time period.

Clause 7: The first wireless device of any of clauses 1 through 6, where the availability schedule indicates that the first wireless device is unavailable during the first time period that overlaps with the second time period.

Clause 8: The first wireless device of any of clauses 1 through 7, where the processing system is further configured to cause the first wireless device to: transmit, during the first time period that overlaps with the second time period, a frame indicating that the first wireless device is available to communicate with the third wireless device using the second communication mode.

Clause 9: The first wireless device of any of clauses 1 through 8, where the processing system is further configured to cause the first wireless device to: transmit, during the second time period that overlaps with the first time period, a frame indicating that the first wireless device is available to communicate with the second wireless device using the first communication mode.

Clause 10: The first wireless device of any of clauses 1 through 9, where the availability schedule indicates that a first TWT schedule associated with the first set of multiple recurring time periods is prioritized over a second TWT schedule associated with the second set of multiple recurring time periods.

Clause 11: The first wireless device of any of clauses 1 through 10, where the availability schedule indicates that a second TWT schedule associated with the second set of multiple recurring time periods is prioritized over a first TWT schedule associated with the first set of multiple recurring time periods.

Clause 12: The first wireless device of any of clauses 1 through 11, where the indication of the availability schedule is provided via one or more fields of a frame from the first wireless device.

Clause 13: The first wireless device of any of clauses 1 through 12, where the indication of the availability schedule is provided via static signaling associated with a setup phase in which one or both of a first periodic communication schedule associated with the first set of multiple recurring time periods or a second periodic communication schedule associated with the second set of multiple recurring time periods is configured for the first wireless device.

Clause 14: The first wireless device of any of clauses 1 through 13, where the indication of the availability schedule is provided via dynamic signaling that includes one or more of a management frame, a TWT information frame, or a TWT setup frame.

Clause 15: The first wireless device of any of clauses 1 through 14, where the availability schedule includes an indication of a time period for which the availability schedule is valid.

Clause 16: The first wireless device of any of clauses 1 through 15, where, to transmit the indication of the availability schedule, the processing system is configured to cause the first wireless device to transmit one or more of a channel usage request frame or a TWT setup frame that indicates the availability schedule, where one or more reserved fields or field values of the channel usage request frame or the TWT setup frame indicate whether the first wireless device intends to be available during the first time period, the second time period, or both.

Clause 17: The first wireless device of any of clauses 1 through 16, where the availability schedule indicates an availability of the first wireless device during the first time period, an availability of the first wireless device during the second time period, or both.

Clause 18: The first wireless device of any of clauses 1 through 17, where the first wireless device is capable of using a set of multiple radios to communicate with the second wireless device and the third wireless device in parallel.

Clause 19: The first wireless device of any of clauses 1 through 18, where the processing system is further configured to cause the first wireless device to: transmit a request for resources usable for communications between the first wireless device and the third wireless device during the first time period associated with the first communication mode.

Clause 20: The first wireless device of any of clauses 1 through 19, where the processing system is further configured to cause the first wireless device to: transition from a doze state of a PS mode to an awake state of the PS mode to communicate with the second wireless device during the first time period associated with the first communication mode; transmit one or more of a PS-Poll frame or a U-APSD frame to notify the third wireless device that the first wireless device is in the awake state; and remain in the awake state after the first time period to receive DL BUs from the third wireless device.

Clause 21: The first wireless device of any of clauses 1 through 20, where the processing system is further configured to cause the first wireless device to: transition from a doze state of a PS mode to an awake state of the PS mode to communicate with the second wireless device during the first time period associated with the first communication mode; transmit one or more of a PS-Poll frame or a U-APSD frame after the first time period to notify the third wireless device that the first wireless device is in the awake state; and receive one or more DL BUs from the third wireless device in accordance with the second communication mode.

Clause 22: The first wireless device of any of clauses 1 through 21, where at least a portion of the first time period associated with the first communication mode overlaps in time with the second time period associated with the second communication mode.

Clause 23: A third wireless device, including: a processing system that includes processor circuitry and memory circuitry that stores code, the processing system configured to cause the third wireless device to: receive first scheduling information associated with a first set of multiple recurring time periods during which a first wireless device is capable of communicating with a second wireless device in accordance with a first communication mode; transmit second scheduling information associated with a second set of multiple recurring time periods during which the first wireless device is capable of communicating with the third wireless device in accordance with a second communication mode; and receive an indication of an availability schedule associated with the first wireless device in accordance with resolving an overlap between at least a first time period of the first set of multiple recurring time periods and a second time period of the second set of multiple recurring time periods.

Clause 24: The third wireless device of clause 23, where the processing system is further configured to cause the third wireless device to: update or terminate a TWT agreement associated with the first set of multiple recurring time periods or the second set of multiple recurring time periods to resolve the overlap between the first time period and the second time period.

Clause 25: The third wireless device of any of clauses 23 through 24, where the first time period of the first set of multiple recurring time periods associated with the second communication mode is prioritized over the second time period of the second set of multiple recurring time periods associated with the first communication mode in resolving the overlap.

Clause 26: The third wireless device of any of clauses 23 through 25, where the second time period of the second set of multiple recurring time periods associated with the first communication mode is prioritized over the first time period of the first set of multiple recurring time periods associated with the second communication mode in resolving the overlap.

Clause 27: A method for wireless communication by a first wireless device, including: receiving first scheduling information associated with a first set of multiple recurring time periods during which the first wireless device is capable of communicating with a second wireless device in accordance with a first communication mode; receiving second scheduling information associated with a second set of multiple recurring time periods during which the first wireless device is capable of communicating with a third wireless device in accordance with a second communication mode; and transmitting an indication of an availability schedule associated with the first wireless device in accordance with resolving an overlap between at least a first time period of the first set of multiple recurring time periods and a second time period of the second set of multiple recurring time periods.

Clause 28: The method of clause 27, further including: updating or terminating a TWT agreement associated with the first set of multiple recurring time periods or the second set of multiple recurring time periods to resolve the overlap between the first time period and the second time period.

Clause 29: The method of clause 28, where the TWT agreement includes one or more of a P2P TWT agreement, an individual TWT agreement, a broadcast TWT agreement, or a restricted TWT agreement associated with the first set of multiple recurring time periods or the second set of multiple recurring time periods.

Clause 30: The method of any of clauses 27 through 29, where the first time period of the first set of multiple recurring time periods associated with the second communication mode is prioritized over the second time period of the second set of multiple recurring time periods associated with the first communication mode in resolving the overlap.

Clause 31: The method of any of clauses 27 through 30, where the second time period of the second set of multiple recurring time periods associated with the first communication mode is prioritized over the first time period of the first set of multiple recurring time periods associated with the second communication mode in resolving the overlap.

Clause 32: The method of any of clauses 27 through 31, where the availability schedule indicates that the first wireless device is unavailable during the second time period that overlaps with the first time period.

Clause 33: The method of any of clauses 27 through 32, where the availability schedule indicates that the first wireless device is unavailable during the first time period that overlaps with the second time period.

Clause 34: The method of any of clauses 27 through 33, further including: transmitting, during the first time period that overlaps with the second time period, a frame indicating that the first wireless device is available to communicate with the third wireless device using the second communication mode.

Clause 35: The method of any of clauses 27 through 34, further including: transmitting, during the second time period that overlaps with the first time period, a frame indicating that the first wireless device is available to communicate with the second wireless device using the first communication mode.

Clause 36: The method of any of clauses 27 through 35, where the availability schedule indicates that a first TWT schedule associated with the first set of multiple recurring time periods is prioritized over a second TWT schedule associated with the second set of multiple recurring time periods.

Clause 37: The method of any of clauses 27 through 36, where the availability schedule indicates that a second TWT schedule associated with the second set of multiple recurring time periods is prioritized over a first TWT schedule associated with the first set of multiple recurring time periods.

Clause 38: The method of any of clauses 27 through 37, where the indication of the availability schedule is provided via one or more fields of a frame from the first wireless device.

Clause 39: The method of any of clauses 27 through 38, where the indication of the availability schedule is provided via static signaling associated with a setup phase in which one or both of a first periodic communication schedule associated with the first set of multiple recurring time periods or a second periodic communication schedule associated with the second set of multiple recurring time periods is configured for the first wireless device.

Clause 40: The method of any of clauses 27 through 39, where the indication of the availability schedule is provided via dynamic signaling that includes one or more of a management frame, a TWT information frame, or a TWT setup frame.

Clause 41: The method of any of clauses 27 through 40, where the availability schedule includes an indication of a time period for which the availability schedule is valid.

Clause 42: The method of any of clauses 27 through 41, where transmitting the indication of the availability schedule includes: transmitting one or more of a channel usage request frame or a TWT setup frame that indicates the availability schedule, where one or more reserved fields or field values of the channel usage request frame or the TWT setup frame indicate whether the first wireless device intends to be available during the first time period, the second time period, or both.

Clause 43: The method of any of clauses 27 through 42, where the availability schedule indicates an availability of the first wireless device during the first time period, an availability of the first wireless device during the second time period, or both.

Clause 44: The method of any of clauses 27 through 43, where the first wireless device is capable of using a set of multiple radios to communicate with the second wireless device and the third wireless device in parallel.

Clause 45: The method of any of clauses 27 through 44, further including: transmitting a request for resources usable for communications between the first wireless device and the third wireless device during the first time period associated with the first communication mode.

Clause 46: The method of any of clauses 27 through 45, further including: transitioning from a doze state of a PS mode to an awake state of the PS mode to communicate with the second wireless device during the first time period associated with the first communication mode; transmitting one or more of a PS-Poll frame or a U-APSD frame to notify the third wireless device that the first wireless device is in the awake state; and remaining in the awake state after the first time period to receive DL BUs from the third wireless device.

Clause 47: The method of any of clauses 27 through 46, further including: transitioning from a doze state of a PS mode to an awake state of the PS mode to communicate with the second wireless device during the first time period associated with the first communication mode; transmitting one or more of a PS-Poll frame or a U-APSD frame after the first time period to notify the third wireless device that the first wireless device is in the awake state; and receiving one or more DL BUs from the third wireless device in accordance with the second communication mode.

Clause 48: The method of any of clauses 27 through 47, where at least a portion of the first time period associated with the first communication mode overlaps in time with the second time period associated with the second communication mode.

Clause 49: A method for wireless communication by a third wireless device, including: receiving first scheduling information associated with a first set of multiple recurring time periods during which a first wireless device is capable of communicating with a second wireless device in accordance with a first communication mode; transmitting second scheduling information associated with a second set of multiple recurring time periods during which the first wireless device is capable of communicating with the third wireless device in accordance with a second communication mode; and receiving an indication of an availability schedule associated with the first wireless device in accordance with resolving an overlap between at least a first time period of the first set of multiple recurring time periods and a second time period of the second set of multiple recurring time periods.

Clause 50: The method of clause 49, further including: updating or terminating a TWT agreement associated with the first set of multiple recurring time periods or the second set of multiple recurring time periods to resolve the overlap between the first time period and the second time period.

Clause 51: The method of any of clauses 49 through 50, where the first time period of the first set of multiple recurring time periods associated with the second communication mode is prioritized over the second time period of the second set of multiple recurring time periods associated with the first communication mode in resolving the overlap.

Clause 52: The method of any of clauses 49 through 51, where the second time period of the second set of multiple recurring time periods associated with the first communication mode is prioritized over the first time period of the first set of multiple recurring time periods associated with the second communication mode in resolving the overlap.

Clause 53: A computer program including instructions that, when individually or collectively executed by one or more processors, cause the one or more processors to perform a method of any one of clauses 27-48.

Clause 54: A computer program including instructions that, when individually or collectively executed by one or more processors, cause the one or more processors to perform a method of any one of clauses 49-52. As used herein, the term "determine" or "determining" encompasses a wide variety of actions and, therefore, "determining" can include calculating, computing, processing, deriving, investigating, looking up (such as via looking up in a table, a database or another data structure), inferring, ascertaining, measuring, and the like. Also, "determining" can include receiving (such as receiving information), accessing (such as accessing data stored in memory), transmitting (such as transmitting information) and the like. Also, "determining" can include resolving, selecting, obtaining, choosing, establishing and other such similar actions.

As used herein, a phrase referring to "at least one of" a list of items refers to any combination of those items, including single members. As an example, "at least one of: a, b, or c" is intended to cover: a, b, c, a-b, a-c, b-c, and a-b-c. As used herein, "or" is intended to be interpreted in the inclusive sense, unless otherwise explicitly indicated. For example, "a or b" may include a only, b only, or a combination of a and b.

As used herein, "based on" is intended to be interpreted in the inclusive sense, unless otherwise explicitly indicated. For example, "based on" may be used interchangeably with "based at least in part on," "associated with", or "in accordance with" unless otherwise explicitly indicated. Specifically, unless a phrase refers to "based on only 'a,'" or the equivalent in context, whatever it is that is "based on 'a,'" or "based at least in part on 'a,'" may be based on "a" alone or based on a combination of "a" and one or more other factors, conditions or information.

As used herein, including in the claims, the article "a" before a noun is open-ended and understood to refer to "at least one" of those nouns or "one or more" of those nouns. Thus, the terms "a," "at least one," "one or more," and "at least one of one or more" may be interchangeable. For example, if a claim recites "a component" that performs one or more functions, each of the individual functions may be performed by a single component or by any combination of multiple components. Thus, "a component" having characteristics or performing functions may refer to "at least one of one or more components" having a particular characteristic or performing a particular function. Subsequent reference to a component introduced with the article "a" using the terms "the" or "said" may refer to any or all of the one or more components. For example, a component introduced with the article "a" may be understood to mean "one or more components," and referring to "the component" subsequently in the claims may be understood to be equivalent to referring to "at least one of the one or more components." Similarly, subsequent reference to a component introduced as "one or more components" using the terms "the" or "said" may refer to any or all of the one or more components. For example, referring to "the one or more components" subsequently in the claims may be understood to be equivalent to referring to "at least one of the one or more components."

The various illustrative components, logic, logical blocks, modules, circuits, operations and algorithm processes described in connection with the examples disclosed herein may be implemented as electronic hardware, firmware, software, or combinations of hardware, firmware or software, including the structures disclosed in this specification and the structural equivalents thereof. The interchangeability of hardware, firmware and software has been described generally, in terms of functionality, and illustrated in the various illustrative components, blocks, modules, circuits and processes described above. Whether such functionality is implemented in hardware, firmware or software depends upon the particular application and design constraints imposed on the overall system.

Various modifications to the examples described in this disclosure may be readily apparent to persons having ordinary skill in the art, and the generic principles defined herein may be applied to other examples without departing from the spirit or scope of this disclosure. Thus, the claims are not intended to be limited to the examples shown herein, but are to be accorded the widest scope consistent with this disclosure, the principles and the novel features disclosed herein.

Additionally, various features that are described in this specification in the context of separate examples also can be implemented in combination in a single implementation. Conversely, various features that are described in the context of a single implementation also can be implemented in multiple examples separately or in any suitable subcombination. As such, although features may be described above as acting in particular combinations, and even initially claimed as such, one or more features from a claimed combination can in some implementations be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Further, the drawings may schematically depict one or more example processes in the form of a flowchart or flow diagram. However, other operations that are not depicted can be incorporated in the example processes that are schematically illustrated. For example, one or more additional operations can be performed before, after, simultaneously, or between any of the illustrated operations. In some circumstances, multitasking and parallel processing may be advantageous. Moreover, the separation of various system components in the examples described above should not be understood as requiring such separation in all examples, and it should be understood that the described program components and systems can generally be integrated together in a single software product or packaged into multiple software products.

What is claimed is:

1. A first wireless device, comprising:
a processing system that includes processor circuitry and memory circuitry that stores code, the processing system configured to cause the first wireless device to:
receive first scheduling information associated with a first plurality of recurring time periods during which the first wireless device is configured to communicate with a second wireless device in accordance with a first communication mode;
receive second scheduling information associated with a second plurality of recurring time periods during which the first wireless device is configured to communicate with a third wireless device in accordance with a second communication mode; and
transmit an indication of an availability schedule associated with the first wireless device in accordance with resolving an overlap between at least a first time period of the first plurality of recurring time periods and a second time period of the second plurality of recurring time periods, wherein the availability schedule indicates whether the first wireless device is to be available during the first time period, the second time period, or both.

2. The first wireless device of claim 1, wherein the processing system is further configured to cause the first wireless device to:
update or terminate a target wake time (TWT) agreement associated with the first plurality of recurring time periods or the second plurality of recurring time periods to resolve the overlap between the first time period and the second time period.

3. The first wireless device of claim 2, wherein the TWT agreement comprises one or more of a peer to peer (P2P) TWT agreement, an individual TWT agreement, a broadcast TWT agreement, or a restricted TWT agreement associated with the first plurality of recurring time periods or the second plurality of recurring time periods.

4. The first wireless device of claim 1, wherein the availability schedule indicates that the first wireless device is unavailable during the second time period that overlaps with the first time period.

5. The first wireless device of claim 1, wherein the availability schedule indicates that the first wireless device is unavailable during the first time period that overlaps with the second time period.

6. The first wireless device of claim 1, wherein the processing system is further configured to cause the first wireless device to:
transmit, during the first time period that overlaps with the second time period, a frame indicating that the first wireless device is available to communicate with the third wireless device using the second communication mode.

7. The first wireless device of claim 1, wherein the processing system is further configured to cause the first wireless device to:
transmit, during the second time period that overlaps with the first time period, a frame indicating that the first wireless device is available to communicate with the second wireless device using the first communication mode.

8. The first wireless device of claim 1, wherein the indication of the availability schedule is provided via static signaling associated with a setup phase in which one or both of a first periodic communication schedule associated with the first plurality of recurring time periods or a second periodic communication schedule associated with the second plurality of recurring time periods is configured for the first wireless device.

9. The first wireless device of claim 1, wherein the indication of the availability schedule is provided via dynamic signaling that includes one or more of a management frame, a target wake time (TWT) information frame, or a TWT setup frame.

10. The first wireless device of claim 1, wherein, to transmit the indication of the availability schedule, the processing system is configured to cause the first wireless device to:
transmit one or more of a channel usage request frame or a target wake time (TWT) setup frame that indicates the availability schedule, wherein one or more reserved fields or field values of the channel usage request frame or the TWT setup frame indicate whether the first wireless device intends to be available during the first time period, the second time period, or both.

11. The first wireless device of claim 1, wherein the availability schedule indicates an availability of the first wireless device during the first time period, an availability of the first wireless device during the second time period, or both.

12. The first wireless device of claim 1, wherein the processing system is further configured to cause the first wireless device to:
transmit a request for resources used for communications between the first wireless device and the third wireless device during the first time period associated with the first communication mode.

13. The first wireless device of claim 1, wherein the processing system is further configured to cause the first wireless device to:
transition from a doze state of a power saving mode to an awake state of the power saving mode to communicate with the second wireless device during the first time period associated with the first communication mode;
transmit one or more of a power save poll frame or an unscheduled automatic power save delivery frame to notify the third wireless device that the first wireless device is in the awake state; and
remain in the awake state after the first time period to receive downlink buffered units from the third wireless device.

14. The first wireless device of claim 1, wherein the processing system is further configured to cause the first wireless device to:
transition from a doze state of a power saving mode to an awake state of the power saving mode to communicate with the second wireless device during the first time period associated with the first communication mode;
transmit one or more of a power save poll frame or an unscheduled automatic power save delivery frame after the first time period to notify the third wireless device that the first wireless device is in the awake state; and
receive one or more downlink buffered units from the third wireless device in accordance with the second communication mode.

15. A third wireless device, comprising:
a processing system that includes processor circuitry and memory circuitry that stores code, the processing system configured to cause the third wireless device to:
receive first scheduling information associated with a first plurality of recurring time periods during which a first wireless device is configured to communicate with a second wireless device in accordance with a first communication mode;
transmit second scheduling information associated with a second plurality of recurring time periods during which the first wireless device is configured to communicate with the third wireless device in accordance with a second communication mode; and
receive an indication of an availability schedule associated with the first wireless device in accordance with resolving an overlap between at least a first time period of the first plurality of recurring time periods and a second time period of the second plurality of recurring time periods, wherein the availability schedule indicates whether the first wireless device is to be available during the first time period, the second time period, or both.

16. The third wireless device of claim 15, wherein the first time period of the first plurality of recurring time periods associated with the second communication mode is prioritized over the second time period of the second plurality of recurring time periods associated with the first communication mode in resolving the overlap.

17. The third wireless device of claim 15, wherein the second time period of the second plurality of recurring time periods associated with the first communication mode is prioritized over the first time period of the first plurality of recurring time periods associated with the second communication mode in resolving the overlap.

18. A method for wireless communication by a first wireless device, comprising:
receiving first scheduling information associated with a first plurality of recurring time periods during which the first wireless device is configured to communicate with a second wireless device in accordance with a first communication mode;
receiving second scheduling information associated with a second plurality of recurring time periods during which the first wireless device is configured to communicate with a third wireless device in accordance with a second communication mode; and
transmitting an indication of an availability schedule associated with the first wireless device in accordance with resolving an overlap between at least a first time period of the first plurality of recurring time periods and a second time period of the second plurality of recurring time periods, wherein the availability schedule indicates whether the first wireless device is to be available during the first time period, the second time period, or both.

19. The method of claim 18, wherein the first time period of the first plurality of recurring time periods associated with the second communication mode is prioritized over the second time period of the second plurality of recurring time periods associated with the first communication mode in resolving the overlap.

20. The method of claim 18, wherein the second time period of the second plurality of recurring time periods associated with the first communication mode is prioritized over the first time period of the first plurality of recurring time periods associated with the second communication mode in resolving the overlap.

* * * * *